US010513249B2

(12) United States Patent
Kim

(10) Patent No.: US 10,513,249 B2
(45) Date of Patent: Dec. 24, 2019

(54) ELECTRIC BRAKE SYSTEM

(71) Applicant: MANDO CORPORATION, Gyeonggi-do (KR)

(72) Inventor: Hyun-Ho Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 7 days.

(21) Appl. No.: 15/791,304

(22) Filed: Oct. 23, 2017

(65) Prior Publication Data

US 2018/0111593 A1    Apr. 26, 2018

(30) Foreign Application Priority Data

Oct. 26, 2016    (KR) ......................... 10-2016-0140033

(51) Int. Cl.
*B60T 13/68*  (2006.01)
*B60T 13/74*  (2006.01)
(Continued)

(52) U.S. Cl.
CPC ............ *B60T 13/686* (2013.01); *B60T 7/042* (2013.01); *B60T 8/00* (2013.01); *B60T 8/17* (2013.01);
(Continued)

(58) Field of Classification Search
CPC .... B60T 13/686; B60T 13/142; B60T 13/745; B60T 13/146; B60T 13/662; B60T 8/88;
(Continued)

(56) References Cited

U.S. PATENT DOCUMENTS 2,451,828 A * 10/1948 Herriott .................. B60T 11/32
303/84.2
4,799,048 A * 1/1989 Goshima .................... F15B 1/04
138/31
(Continued)

FOREIGN PATENT DOCUMENTS

CN    103786708    5/2014
CN    203864681    10/2014
(Continued)

OTHER PUBLICATIONS

Office Action dated Jul. 15, 2019 for Chinese Patent Application No. 201711017302.X and its English translation by Global Dossier.

*Primary Examiner* — Melody M Burch
(74) *Attorney, Agent, or Firm* — Ladas & Parry, LLP

(57) ABSTRACT

Disclosed is an electric brake system. The electric brake system includes a master cylinder including first and second chambers, and first and second pistons disposed at the first and second chambers, respectively; a simulation device connected to the master cylinder and configured to provide a reaction force according to pedal effort of a brake pedal; a hydraulic pressure supply device configured to generate a hydraulic pressure by a hydraulic piston which is operated by an electrical signal that is output to correspond to displacement of the brake pedal; a hydraulic pressure control unit configured to deliver the hydraulic pressure discharged from the hydraulic pressure supply device to a wheel cylinder provided at each of wheels; a first backup flow path and a second backup flow path configured to connect the master cylinder and the hydraulic pressure control unit; a first cut valve and a second cut valve configured to control delivery of a hydraulic pressure of the first and second backup flow paths; an electronic control unit (ECU); a first pressure sensor installed between the first chamber of the master cylinder and the first cut valve; and a second pressure sensor installed at the first hydraulic flow path, the second hydraulic flow path, or the hydraulic pressure control unit, wherein, in a state in which the second cut valve is closed and the outlet valve, which is connected to the second backup flow path, is opened, to discharge the hydraulic pressure in the hydraulic pressure control unit connected to the second hydraulic flow path, the ECU operates the hydraulic pressure supply device to generate a pressure in the first chamber, and when a measured value of the second (Continued)

pressure sensor is less than an expected value, the ECU determines that the second piston of the master cylinder is stuck.

10 Claims, 18 Drawing Sheets

(51) Int. Cl.
| | |
|---|---|
| *B60T 8/88* | (2006.01) |
| *B60T 13/14* | (2006.01) |
| *B60T 7/04* | (2006.01) |
| *B60T 8/00* | (2006.01) |
| *B60T 8/17* | (2006.01) |
| *B60T 13/66* | (2006.01) |
| *B60T 8/40* | (2006.01) |
| *B60T 8/90* | (2006.01) |

(52) U.S. Cl.
CPC .............. *B60T 8/4081* (2013.01); *B60T 8/88* (2013.01); *B60T 8/90* (2013.01); *B60T 13/142* (2013.01); *B60T 13/146* (2013.01); *B60T 13/662* (2013.01); *B60T 13/745* (2013.01); *B60T 2270/403* (2013.01)

(58) Field of Classification Search
CPC . B60T 8/00; B60T 8/17; B60T 8/4081; B60T 8/90; B60T 7/042; B60T 2270/403
See application file for complete search history.

(56) References Cited

U.S. PATENT DOCUMENTS

2014/0368026 A1* 12/2014 Fushimi ................ B60T 11/101
 303/9.64
2018/0339690 A1* 11/2018 Kim ...................... B60T 13/745

FOREIGN PATENT DOCUMENTS

| CN | 104276156 | 1/2015 |
|---|---|---|
| CN | 105644539 | 6/2016 |
| CN | 105691372 | 6/2016 |
| CN | 105799679 | 7/2016 |
| EP | 2 520 473 | 11/2012 |

\* cited by examiner

ELECTRIC BRAKE SYSTEM

CROSS-REFERENCE TO RELATED APPLICATION

This application claims the priority to Korean Patent Application No. 10-2016-0140033, filed on Oct. 26, 2016 in the Korean Intellectual Property Office, the disclosure of which is incorporated herein by reference in its entirety.

BACKGROUND

1. Field

Embodiments of the present disclosure relate to an electric brake system, and more particularly, to an electric brake system configured to generate a braking force using an electrical signal corresponding to displacement of a brake pedal.

2. Description of the Related Art

A brake system for braking is necessarily mounted on a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a driving wheel from slipping when a vehicle starts or accelerates suddenly, an electronic stability control (ESC) system for stably maintaining a driving state of a vehicle by combining an ABS with traction control to control a hydraulic pressure of a brake, and the like.

Generally, an electric brake system includes a hydraulic pressure supply device which receives a braking intent of a driver in the form of an electrical signal from a pedal displacement sensor which senses displacement of a brake pedal when the driver steps on the brake pedal and then supplies a hydraulic pressure to a wheel cylinder.

An electric brake system in which such a hydraulic pressure supply device is provided is disclosed in European Registered Patent No. EP 2 520 473. According to the disclosure in that document, the hydraulic pressure supply device is configured such that a motor operates according to pedal effort of a brake pedal to generate a braking pressure. At this point, the braking pressure is generated by converting a rotational force of the motor into a rectilinear movement to pressurize a piston.

PRIOR ART DOCUMENT

Patent Document

European Registered Patent No. EP 2 520 473 A1 (Honda Motor Co., Ltd.), Nov. 7, 2012.

SUMMARY

Therefore, it is an aspect of the present disclosure to provide an electric brake system in which an inspection mode is executed.

Additional aspects of the disclosure will be set forth in part in the description which follows and, in part, will be obvious from the description, or may be learned by practice of the disclosure.

In accordance with one aspect of the present disclosure, an electric brake system including a master cylinder including first and second chambers which are formed inside the master cylinder and configured to communicate with a reservoir which stores oil, and first and second pistons disposed at the first and second chambers, respectively, and configured to discharge oil by movements of the first and second pistons according to pedal effort of a brake pedal; a simulation device connected to the master cylinder and configured to provide a reaction force according to the pedal effort of the brake pedal; a hydraulic pressure supply device configured to generate a hydraulic pressure by a hydraulic piston which is operated by an electrical signal that is output to correspond to displacement of the brake pedal; a hydraulic pressure control unit configured to deliver the hydraulic pressure discharged from the hydraulic pressure supply device to a wheel cylinder provided at each of wheels, and including an inlet valve provided at a flow path connecting the hydraulic pressure supply device and the wheel cylinder, and an outlet valve provided at a flow path connecting between the wheel cylinder, and the reservoir; a first backup flow path configured to connect the first chamber of the master cylinder and the hydraulic pressure control unit and connected to a first hydraulic flow path that is connected to the hydraulic pressure supply device; a second backup flow path configured to connect the second chamber of the master cylinder and the hydraulic pressure control unit and connected to a second hydraulic flow path that is connected to the hydraulic pressure supply device; a first cut valve provided between the first chamber of the master cylinder and a position at which the first hydraulic flow path is connected to the first backup flow path, and configured to control delivery of a hydraulic pressure; a second cut valve provided between the second chamber of the master cylinder and a position at which the second hydraulic flow path is connected to the second backup flow path, and configured to control delivery of a hydraulic pressure; an electronic control unit (ECU) configured to control valves on the basis of hydraulic pressure information and displacement information of the brake pedal; and a first pressure sensor installed between the first chamber of the master cylinder and the first cut valve, and a second pressure sensor installed at the first hydraulic flow path, the second hydraulic flow path, or the hydraulic pressure control unit, wherein, in a state in which the second cut valve is closed and the outlet valve, which is connected to the second backup flow path, is open, to discharge the hydraulic pressure in the hydraulic pressure control unit connected to the second hydraulic flow path, the ECU operates the hydraulic pressure supply device to generate a pressure in the first chamber, and when a measured value of the second pressure sensor is less than an expected value, the ECU determines that the second piston of the master cylinder is stuck.

The ECU may compare a measured value of the first pressure sensor with the measured value of the second pressure sensor, and when the measured value of the second pressure sensor is less than the measured value of the first pressure sensor, the ECU may determine that the second piston of the master cylinder is stuck.

The electric brake system may further include a check valve provided at a reservoir flow path connecting the reservoir and the master cylinder, and configured to allow fluid to flow only in a direction from the reservoir to the master cylinder; and an inspection valve installed at a bypass flow path connecting front and rear sides of the check valve on the reservoir flow path, wherein the ECU may control the check valve to be in a closed state before operating the hydraulic pressure supply device.

The electric brake system may further include a simulator valve configured to open and close a flow path between the master cylinder and the simulation device, wherein the ECU may control the simulator valve to be in a closed state before operating the hydraulic pressure supply device.

The ECU may control the inlet valve to be in a closed state.

In accordance with another aspect of the present disclosure, an electric brake system including a master cylinder including first and second chambers which are formed inside the master cylinder and configured to communicate with a reservoir which stores oil, and first and second pistons disposed at the first and second chambers, respectively, and configured to discharge oil by movements of the first and second pistons according to pedal effort of a brake pedal; a simulation device connected to the master cylinder and configured to provide a reaction force according to the pedal effort of the brake pedal; a hydraulic pressure supply device configured to generate a hydraulic pressure by a hydraulic piston which is operated by an electrical signal that is output to correspond to displacement of the brake pedal; a hydraulic pressure control unit configured to deliver the hydraulic pressure discharged from the hydraulic pressure supply device to a wheel cylinder provided at each of wheels, and including an inlet valve provided at a flow path connecting the hydraulic pressure supply device and the wheel cylinder, and an outlet valve provided at a flow path connecting between the wheel cylinder, and the reservoir; a first backup flow path configured to connect the first chamber of the master cylinder and the hydraulic pressure control unit and connected to a first hydraulic flow path that is connected to the hydraulic pressure supply device; a second backup flow path configured to connect the second chamber of the master cylinder and the hydraulic pressure control unit and connected to a second hydraulic flow path that is connected to the hydraulic pressure supply device; a first cut valve provided between the first chamber of the master cylinder and a position at which the first hydraulic flow path is connected to the first backup flow path, and configured to control delivery of a hydraulic pressure; a second cut valve provided between the second chamber of the master cylinder and a position at which the second hydraulic flow path is connected to the second backup flow path, and configured to control delivery of a hydraulic pressure; an electronic control unit (ECU) configured to control valves on the basis of hydraulic pressure information and displacement information of the brake pedal; and a first pressure sensor installed between the second chamber of the master cylinder and the second cut valve, and a second pressure sensor installed at the first hydraulic flow path, the second hydraulic flow path, or the hydraulic pressure control unit, wherein, in a state in which the second cut valve is closed, the ECU operates the hydraulic pressure supply device to generate a pressure in the first chamber, and when a measured value of the first pressure sensor is less than an expected value, the ECU determines that air is present in the first chamber of the master cylinder.

In a state in which the inlet valve connected to the second backup flow path is closed to block a flow path between the hydraulic pressure supply device and the wheel cylinder, the ECU may operate the hydraulic pressure supply device to generate a pressure in the first chamber, and when the measured value of the first pressure sensor is less than the expected value, the ECU may determine that air is present in the first chamber of the master cylinder.

The electric brake system may further include a check valve provided at a reservoir flow path connecting the reservoir and the master cylinder, and configured to allow fluid to flow only in a direction from the reservoir to the master cylinder; and an inspection valve installed at a bypass flow path connecting front and rear sides of the check valve on the reservoir flow path, wherein the ECU may control the check valve to be in a closed state before operating the hydraulic pressure supply device.

The electric brake system may further include a simulator valve configured to open and close a flow path between the master cylinder and the simulation device, wherein the ECU may control the simulator valve to be in a closed state before operating the hydraulic pressure supply device.

The ECU may control the inlet valve to be in a closed state.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a hydraulic pressure circuit diagram illustrating a situation in which the hydraulic piston is moved forward and selective braking is performed, and FIG. 11 is a hydraulic pressure circuit diagram illustrating a situation in which the hydraulic piston is moved backward and selective braking is performed;

DETAILED DESCRIPTION

Figure 1:
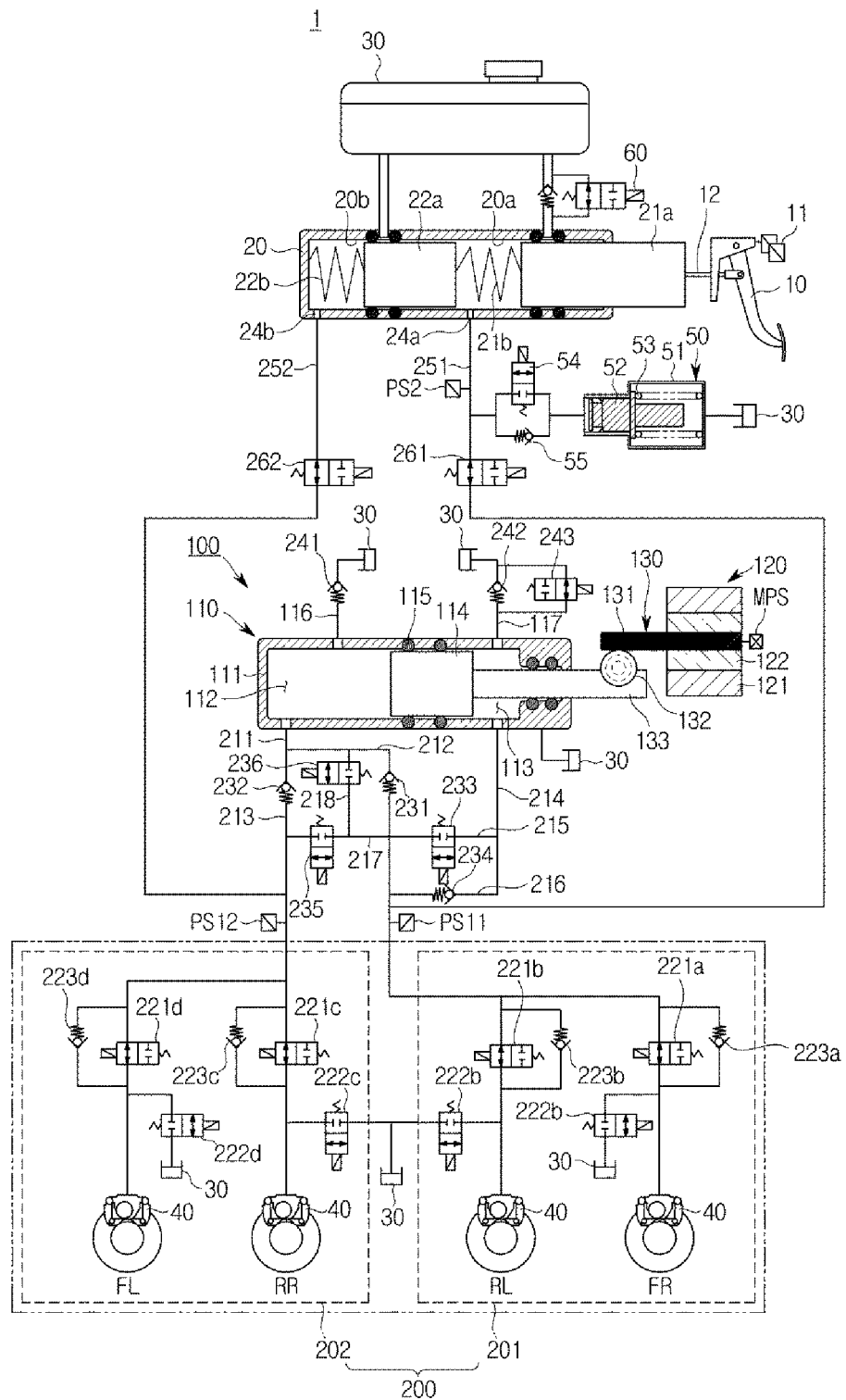
FIG. 1 is a hydraulic pressure circuit diagram illustrating a non-braking state of an electric brake system according to an embodiment of the present disclosure.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not shown to clearly describe the present disclosure, and sizes of components may be somewhat exaggerated to facilitate understanding.

FIG. 1 is a hydraulic pressure circuit diagram illustrating a non-braking state of an electric brake system 1 according to an embodiment of the present disclosure.

Referring to FIG. 1, the electric brake system 1 is generally configured with a master cylinder 20 configured to generate a hydraulic pressure, a reservoir 30 coupled to an upper part of the master cylinder 20 to store oil, an input rod 12 configured to pressurize the master cylinder 20 according to pedal effort of a brake pedal 10, a wheel cylinder 40 configured to receive the hydraulic pressure and perform braking of each of wheels RR, RL, FR, and FL, a pedal displacement sensor 11 configured to sense displacement of the brake pedal 10, and a simulation device 50 configured to provide a reaction force according to the pedal effort of the brake pedal 10.

The master cylinder 20 may be configured to include at least one chamber to generate a hydraulic pressure. As one example, a first master chamber 20a and a second master chamber 20b may be provided in the master cylinder 20.

Figure 2:
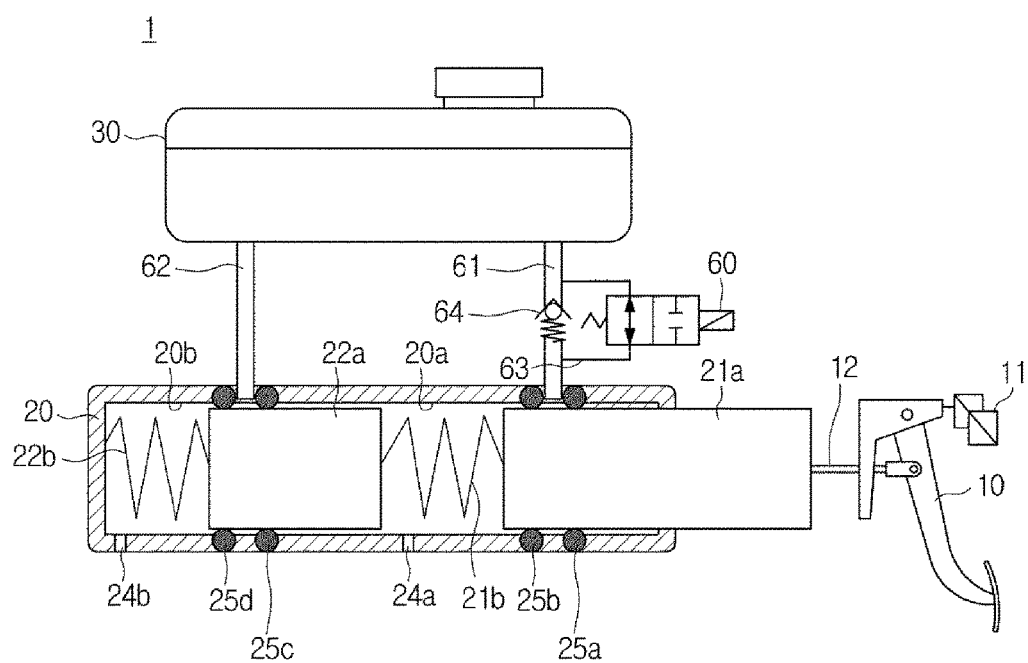
FIG. 2 is an enlarged diagram illustrating a master cylinder according to the embodiment of the present disclosure.

Next, the master cylinder 20 according to the embodiment of the present disclosure will be described with reference to FIG. 2. FIG. 2 is an enlarged diagram illustrating the master cylinder 20 according to the embodiment of the present disclosure.

A first piston 21a connected to the input rod 12 is provided at the first master chamber 20a, and a second piston 22a is provided at the second master chamber 20b. Further, the first master chamber 20a communicates with a first hydraulic pressure port 24a to enable oil to flow in and out, and the second master chamber 20b communicates with a second hydraulic pressure port 24b to enable the oil to flow in and out. As one example, the first hydraulic pressure port 24a may be connected to a first backup flow path 251, and the second hydraulic pressure port 24b may be connected to a second backup flow path 252.

Meanwhile, the master cylinder 20 may include the two master chambers 20a and 20b to secure safety when one chamber fails. For example, the first master chamber 20a of the two master chambers 20a and 20b may be connected to the front right wheel FR and the rear left wheel RL of the vehicle through the first backup flow path 251, and the second master chamber 20b thereof may be connected to the front left wheel FL and the rear right wheel RR through the second backup flow path 252. As described above, the two master chambers 20a and 20b may be independently configured so that braking of the vehicle may be possible even when one of the two master chambers 20a and 20b fails.

Also, unlike the drawings, one of the two master chambers 20a and 20b may be connected to the two front wheels FR and FL and the remaining master chamber may be connected to the two rear wheels RR and RL. In addition to the described above, one of the two master chambers 20a and 20b may be connected to the front left wheel FL and the rear left wheel RL, and the remaining master chamber may be connected to the rear right wheel RR and the front right wheel FR. That is, a variety of connection configurations may be established between the chambers of the master cylinder 20 and the wheels.

Also, a first spring 21b may be provided between the first piston 21a and the second piston 22a of the master cylinder 20, and a second spring 22b may be provided between the second piston 22a and an end part of the master cylinder 20. That is, the first piston 21a may be accommodated in the first master chamber 20a, and the second piston 22a may be accommodated in the second master chamber 20b.

The first spring 21b and the second spring 22b are compressed by the first piston 21a and the second piston 22a which are moved according to varied displacement of the brake pedal 10, thereby storing an elastic force therein. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 configured to pressurize the first piston 21a of the master cylinder 20 may be in close contact with the first piston 21a. That is, there may be no gap between the master cylinder 20 and the input rod 12. Consequently, when the brake pedal 10 is stepped on, the master cylinder 20 may be directly pressurized without a pedal dead stroke section.

Also, the first master chamber 20a may be connected to the reservoir 30 through a first reservoir flow path 61, and the second master chamber 20b may be connected to the reservoir 30 through a second reservoir flow path 62.

Also, the master cylinder 20 may include two sealing members 25a and 25b which are disposed in front and rear of the first reservoir flow path 61, and two sealing members 25c and 25d which are disposed in front and rear of the second reservoir flow path 62. The sealing members 25a, 25b, 25c, and 25d may have a ring shape that protrudes to an inner wall of the master cylinder 20 or an outer circumferential surface of each of the pistons 21a and 22a, respectively.

Also, a check valve 64 may be provided at the first reservoir flow path 61 to enable oil to flow in from the reservoir 30 to the first master chamber 20a and block oil from flowing in from the first master chamber 20a to the reservoir 30. The check valve 64 may be provided to enable fluid to flow in one direction.

Further, a front side and a rear side of the check valve 64 of the first reservoir flow path 61 may be connected to each other through a bypass flow path 63. Also, an inspection valve 60 may be provided at the bypass flow path 63.

A bidirectional control valve which controls an oil flow between the reservoir 30 and the master cylinder 20 may be provided in the inspection valve 60. Further, the inspection valve 60 may be configured with a normally open type solenoid valve that is usually open and is closed when a closing signal is received from an electronic control unit (ECU).

A detailed function and an operating process of the inspection valve 60 will be described below.

The simulation device 50 may be connected to a first backup flow path 251, which will be described below, to provide a reaction force according to pedal effort of the brake pedal 10. A reaction force may be provided to compensate for pedal effort provided from a driver such that a braking force may be finely controlled as intended by the driver.

Referring to FIG. 1, the simulation device 50 includes a simulation chamber 51 provided to store oil flowing out from the first hydraulic pressure port 24a of the master cylinder 20, a reaction force piston 52 provided inside the simulation chamber 51, a pedal simulator in which a reaction force spring 53 that is configured to elastically support the reaction force piston 52 is provided, and a simulator valve 54 connected to a rear end part of the simulation chamber 51.

The reaction force piston 52 and the reaction force spring 53 are installed to have a predetermined range of a displacement within the simulation chamber 51 due to oil flowing therein.

Meanwhile, the reaction force spring 53 shown in the drawing is merely one embodiment capable of providing an elastic force to the reaction force piston 52, and thus it may include numerous embodiments capable of storing the elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting the rear end part of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, even when the reaction force piston 52 returns, oil in the reservoir 30 may flow in the simulation chamber 51 through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. Here, these reservoirs 30 may be configured with the same components, and may alternatively be configured with different components. As one example, the reservoir 30 connected to the simulation device 50 may be the same as the reservoir 30 connected to the master cylinder 20, or may be a storage part capable of storing oil separately from the reservoir 30 that is connected to the master cylinder 20.

Meanwhile, the simulator valve 54 may be configured with a normally closed type solenoid valve that is usually maintained in a closed state. When the driver applies pedal effort to the brake pedal 10, the simulator valve 54 may be opened to deliver oil in the simulation chamber 51 to the reservoir 30.

Also, a simulator check valve 55 may be installed to be connected in parallel with the simulator valve 54 between the pedal simulator and the reservoir 30. The simulator check valve 55 may allow the oil in the reservoir 30 to flow toward the simulation chamber 51 and may block the oil in the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure rapid return of a pressure in the pedal simulator.

To describe an operating process of the simulation device 50, when the driver applies pedal effort to the brake pedal 10, the oil in the simulation chamber 51, which is pushed by the reaction force piston 52 of the pedal simulator while the reaction force piston 52 pressurizes the reaction force spring 53, is delivered to the reservoir 30 through the simulator valve 54, and then a pedal feeling is provided to the driver through such an operating process. Further, when the driver releases the pedal effort from the brake pedal 10, the reaction force spring 53 may push the reaction force piston 52 to return the reaction force piston 52 to its original state, and the oil in the reservoir 30 may flow inside the simulation chamber 51 through the flow path at which the simulator valve 54 is installed and the flow path at which the simulator check valve 55 is installed, thereby completely filling the inside of the simulation chamber 51 with the oil.

As described above, since the inside of the simulation chamber 51 is in a state in which the oil is always filled therein, friction of the reaction force piston 52 is minimized when the simulation device 50 operates, and thus durability of the simulation device 50 may be improved and further introduction of foreign materials from the outside may be blocked.

The electric brake system 1 according to the embodiment of the present disclosure may include the hydraulic pressure supply device 100 configured to receive a braking intent of a driver in the form of an electrical signal from the pedal displacement sensor 11 sensing displacement of the brake pedal 10, and to operate mechanically; a hydraulic pressure control unit 200 configured with first and second hydraulic pressure circuits 201 and 202, which are each provided with two wheels among the wheels RR, RL, FR, and FL, and configured to control delivery of a hydraulic pressure provided to the wheel cylinders 40 provided at the wheels RR, RL, FR, and FL; a first cut valve 261 provided at the first backup flow path 251 connecting the first hydraulic pressure port 24a to the first hydraulic pressure circuit 201 and configured to control the flow of the hydraulic pressure; a second cut valve 262 provided at a second backup flow path 252 connecting the second hydraulic pressure port 24b to the second hydraulic pressure circuit 202 and configured to control the flow of the hydraulic pressure; and the ECU (not shown) configured to control the hydraulic pressure supply device 100 and valves 54, 60, 221a, 221b, 221c, 221d, 222a, 222b, 222c, 222d, 233, 235, 236, and 243 on the basis of hydraulic pressure information and pedal displacement information.

The hydraulic pressure supply device 100 may include a hydraulic pressure supply unit 110 configured to provide an oil pressure delivered to the wheel cylinders 40, a motor 120 configured to generate a rotational force in response to an electrical signal from the pedal displacement sensor 11, and a power converter 130 configured to convert a rotational movement of the motor 120 into a rectilinear movement and transmit the rectilinear movement to the hydraulic pressure supply unit 110. Alternatively, the hydraulic pressure supply unit 110 may operate by a pressure provided from a high-pressure accumulator instead of a driving force supplied from the motor 120.

Figure 3:
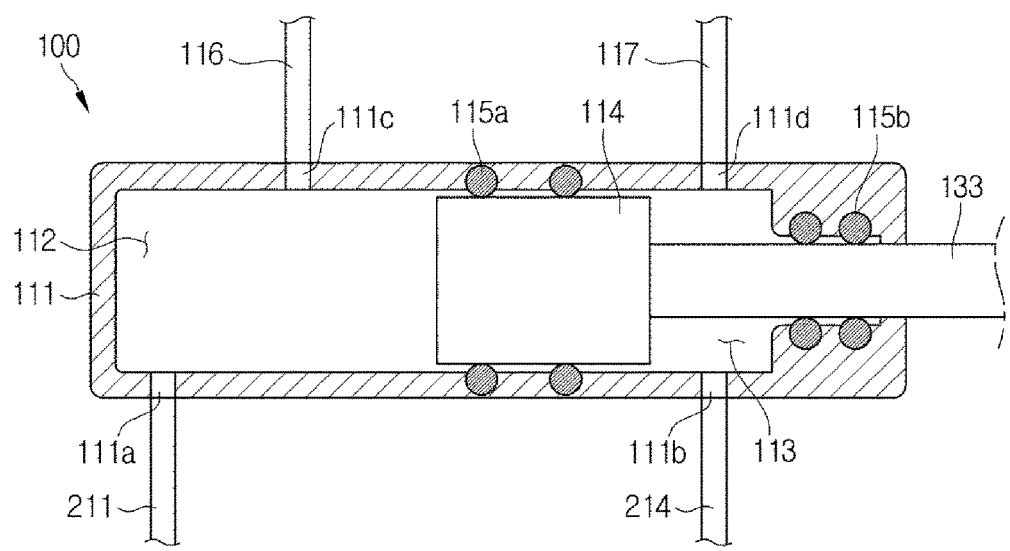
FIG. 3 is an enlarged diagram of a hydraulic pressure supply unit according to the embodiment of the present disclosure.

Next, the hydraulic pressure supply unit 110 according to the embodiment of the present disclosure will be described with reference to FIG. 3. FIG. 3 is an enlarged diagram of the hydraulic pressure supply unit 110 according to the embodiment of the present disclosure.

The hydraulic pressure supply unit 110 includes a cylinder block 111 in which a pressure chamber configured to receive and store oil is formed, a hydraulic piston 114 accommodated inside the cylinder block 111, sealing members 115 (that is, 115a and 115b) provided between the hydraulic piston 114 and the cylinder block 111 and configured to seal the pressure chamber, and a drive shaft 133 connected to a rear end part of the hydraulic piston 114 and configured to transmit power, which is output from the power converter 130, to the hydraulic piston 114.

The pressure chamber may include a first pressure chamber 112 located at a front side (in a forward movement direction, that is, a left direction in the drawing) of the hydraulic piston 114, and a second pressure chamber 113 located at a rear side (in a backward movement direction, that is, a right direction in the drawing) of the hydraulic piston 114. That is, the first pressure chamber 112 is comparted by the cylinder block 111 and a front end of the hydraulic piston 114 and is provided to have a volume that varies according to a movement of the hydraulic piston 114, and the second pressure chamber 113 is comparted by the cylinder block 111 and a rear end of the hydraulic piston 114 and is provided to have a volume that varies according to the movement of the hydraulic piston 114.

The first pressure chamber 112 is connected to a first hydraulic flow path 211 through a first communicating hole 111a formed at a rear side of the cylinder block 111, and is connected to a fourth hydraulic flow path 214 through a second communicating hole 111b formed at a front side of the cylinder block 111. The first hydraulic flow path 211 connects the first pressure chamber 112 to the first and second hydraulic pressure circuits 201 and 202. Further, the first hydraulic flow path 211 branches into a second hydraulic flow path 212 communicating with the first hydraulic pressure circuit 201, and a third hydraulic flow path 213 communicating with the second hydraulic pressure circuit 202. The fourth hydraulic flow path 214 connects the second pressure chamber 113 to the first and second hydraulic pressure circuits 201 and 202. Further, the fourth hydraulic flow path 214 branches into a fifth hydraulic flow path 215 communicating with the first hydraulic pressure circuit 201, and a sixth hydraulic flow path 216 communicating with the second hydraulic pressure circuit 202.

The sealing member 115 includes a piston sealing member 115a provided between the hydraulic piston 114 and the cylinder block 111 to seal between the first pressure chamber 112 and the second pressure chamber 113, and a drive shaft sealing member 115b provided between the drive shaft 133 and the cylinder block 111 to seal an opening between the second pressure chamber 113 and the cylinder block 111. That is, a hydraulic pressure or a negative pressure of the first pressure chamber 112, which is generated while the hydraulic piston 114 is moved forward or backward, may be blocked by the piston sealing member 115a and may be delivered to the first and fourth hydraulic flow paths 211 and 214 without leaking into the second pressure chamber 113.

Further, a hydraulic pressure or a negative pressure of the second pressure chamber 113, which is generated while the hydraulic piston 114 is moved forward or backward, may be blocked by the drive shaft sealing member 115b and may not leak into the cylinder block 111.

The first and second pressure chambers 112 and 113 may be respectively connected to the reservoir 30 by dump flow paths 116 and 117, and may receive and store oil supplied from the reservoir 30 or deliver oil in the first or second pressure chamber 112 or 113 to the reservoir 30. As one example, the dump flow paths 116 and 117 may include a first dump flow path 116 branching from the first pressure chamber 112 and connected to the reservoir 30, and a second dump flow path 117 branching from the second pressure chamber 113 and connected to the reservoir 30.

Also, the first pressure chamber 112 may be connected to the first dump flow path 116 through a fifth communicating hole 111f formed at a front side, and the second pressure chamber 113 may be connected to the second dump flow path 117 through a sixth communicating hole 111e formed at a rear side.

Further, the first communicating hole 111a communicating with the first hydraulic flow path 211 may be formed at a front side of the first pressure chamber 112, and the second communicating hole 111b communicating with the fourth hydraulic flow path 214 may be formed at a rear side of the first pressure chamber 112. Also, a third communicating hole 111c communicating with the first dump flow path 116 may be further formed at the first pressure chamber 112.

Further, the second communicating hole 111b communicating with the fourth hydraulic flow path 214, and a fourth communicating hole 111d communicating with the second dump flow path 117 may be formed at the second pressure chamber 113.

Referring back to FIG. 1, flow paths 211, 212, 213, 214, 215, 216, and 217 and valves 231, 232, 233, 234, 235, 236, 241, 242, and 243, which are connected to the first pressure chamber 112 and the second pressure chamber 113, respectively, will be described.

The second hydraulic flow path 212 may communicate with the first hydraulic pressure circuit 201, and the third hydraulic flow path 213 may communicate with the second hydraulic pressure circuit 202. Therefore, a hydraulic pressure may be delivered to both the first hydraulic pressure circuit 201 and the second hydraulic pressure circuit 202 while the hydraulic piston 114 is moved forward.

Also, the electric brake system 1 according to the embodiment of the present disclosure may include a first control valve 231 and a second control valve 232 which are provided at the second and third hydraulic flow paths 212 and 213, respectively, and are configured to control an oil flow.

Further, the first and second control valves 231 and 232 may be configured with a check valve which allows oil to flow only in a direction from the first pressure chamber 112 toward the first or second hydraulic pressure circuit 201 or 202, respectively, and blocks the oil from flowing in a reverse direction. That is, the first or second control valve 231 or 232 may enable the hydraulic pressure of the first pressure chamber 112 to be delivered to the first or second hydraulic pressure circuit 201 or 202, and prevent a hydraulic pressure of the first or second hydraulic pressure circuit 201 and 202 from leaking into the first pressure chamber 112 through the second or third hydraulic flow path 212 or 213.

Meanwhile, a fourth hydraulic flow path 214 may branch into a fifth hydraulic flow path 215 and a sixth hydraulic flow path 216 at the middle of the fourth hydraulic flow path 214, thereby communicating with both the first hydraulic pressure circuit 201 and the second hydraulic pressure circuit 202. As one example, the fifth hydraulic flow path 215 branching from the fourth hydraulic flow path 214 may communicate with the first hydraulic pressure circuit 201, and the sixth hydraulic flow path 216 branching from the fourth hydraulic flow path 214 may communicate with the second hydraulic pressure circuit 202. Accordingly, a hydraulic pressure may be delivered to both the first hydraulic pressure circuit 201 and the second hydraulic pressure circuit 202 while the hydraulic piston 114 is moved backward.

Also, the electric brake system 1 according to the embodiment of the present disclosure may include a third control valve 233 provided at the fifth hydraulic flow path 215 and configured to control an oil flow, and a fourth control valve 234 provided at the sixth hydraulic flow path 216 and configured to control an oil flow.

The third control valve 233 may be configured with a bidirectional control valve which controls an oil flow between the second pressure chamber 113 and the first hydraulic pressure circuit 201. Further, the third control valve 233 may be configured with a normally closed type solenoid valve that is usually closed and is opened when an opening signal is received from the ECU.

Also, the fourth control valve 234 may be configured with a check valve which allows oil to flow only in a direction from the second pressure chamber 113 toward the second hydraulic pressure circuit 202 and blocks oil from flowing in a reverse direction. That is, the fourth control valve 234 may prevent the hydraulic pressure of the second hydraulic pressure circuit 202 from leaking into the second pressure chamber 113 through the sixth hydraulic flow path 216 and the fourth hydraulic flow path 214.

Also, the electric brake system 1 according to the embodiment of the present disclosure may include a fifth control valve 235 provided at a seventh hydraulic flow path 217 connecting the second hydraulic flow path 212 to the third hydraulic flow path 213 and configured to control an oil flow, and a sixth control valve 236 provided at an eighth hydraulic flow path 218 connecting the second hydraulic flow path 212 to the seventh hydraulic flow path 217 and configured to control an oil flow. Further, the fifth control valve 235 and the sixth control valve 236 may be configured with normally closed type solenoid valves that are usually closed and are open when an opening signal is received from the ECU.

The fifth control valve 235 and the sixth control valve 236 may be respectively operated to be open when the first control valve 231 or the second control valve 232 is operated abnormally, thereby allowing the hydraulic pressure of the first pressure chamber 112 to be delivered to both the first hydraulic pressure circuit 201 and the second hydraulic pressure circuit 202.

Further, the fifth control valve 235 and the sixth control valve 236 may be operated to be open when a hydraulic pressure of each of the wheel cylinders 40 is discharged and then delivered to the first pressure chamber 112. This is because the first control valve 231 and the second control valve 232 provided at the second hydraulic flow path 212 and the third hydraulic flow path 213, respectively, are configured with check valves allowing oil to flow in one direction.

Also, the electric brake system 1 according to the embodiment of the present disclosure may further include a first dump valve 241 and a second dump valve 242 which are provided at the first and second dump flow paths 116 and 117, respectively, and configured to control an oil flow. The dump valves 241 and 242 may be check valves that open in a direction from the reservoir 30 to the first and second pressure chambers 112 and 113, and block in a reverse direction. That is, the first dump valve 241 may be a check valve that allows oil to flow from the reservoir 30 to the first pressure chamber 112 and blocks the oil from flowing from the first pressure chamber 112 to the reservoir 30, and the second dump valve 242 may be a check valve that allows oil to flow from the reservoir 30 to the second pressure chamber 113 and blocks the oil from flowing from the second pressure chamber 113 to the reservoir 30.

Also, the second dump flow path 117 may include a bypass flow path, and a third dump valve 243 may be installed at the bypass flow path to control an oil flow between the second pressure chamber 113 and the reservoir 30.

The third dump valve 243 may be configured with a solenoid valve capable of bidirectionally controlling an oil flow, and with a normally open type solenoid valve that is usually open and is closed when a closing signal is received from the ECU.

The hydraulic pressure supply unit 110 of the electric brake system 1 according to the embodiment of the present disclosure may operate with double action. That is, a hydraulic pressure generated in the first pressure chamber 112 while the hydraulic piston 114 is moved forward may be delivered to the first hydraulic pressure circuit 201 through the first hydraulic flow path 211 and the second hydraulic flow path 212 to operate the wheel cylinders 40 installed at the front right wheel FR and the rear left wheel RL, and may be delivered to the second hydraulic pressure circuit 202 through the first hydraulic flow path 211 and the third hydraulic flow path 213 to operate the wheel cylinders 40 installed at the rear right wheel RR and the front left wheel FL.

Similarly, a hydraulic pressure generated in the second pressure chamber 113 while the hydraulic piston 114 is moved backward may be delivered to the first hydraulic pressure circuit 201 through the fourth hydraulic flow path 214 and the fifth hydraulic flow path 215 to operate the wheel cylinders 40 installed at the front right wheel FR and the rear left wheel RL, and may be delivered to the second hydraulic pressure circuit 202 through the fourth hydraulic flow path 214 and the sixth hydraulic flow path 216 to operate the wheel cylinders 40 installed at the rear right wheel RR and the front left wheel FL.

Also, a negative pressure generated in the first pressure chamber 112 while the hydraulic piston 114 is moved backward may cause oil in the wheel cylinders 40 installed at the front right wheel FR and the rear left wheel RL to be suctioned and delivered to the first pressure chamber 112 through the first hydraulic pressure circuit 201, the second hydraulic flow path 212, and the first hydraulic flow path 211, and may cause oil in the wheel cylinders 40 installed at the rear right wheel RR and the front left wheel FL to be suctioned and delivered to the first pressure chamber 112 through the second hydraulic pressure circuit 202, the third hydraulic flow path 213, and the first hydraulic flow path 211.

Next, the motor 120 and the power converter 130 of the hydraulic pressure supply device 100 will be described.

The motor 120 is a device configured to generate a rotational force according to a signal output from the ECU (not shown) and may generate the rotational force in a forward or backward direction. An angular velocity and a rotational angle of the motor 120 may be precisely controlled. Since such a motor 120 is generally known in the related art, a detailed description thereof will be omitted.

Meanwhile, the ECU controls not only the motor 120 but also valves 54, 60, 221*a*, 221*b*, 221*c*, 221*d*, 222*a*, 222*b*, 222*c*, 222*d*, 233, 235, 236, and 243 provided at the electric brake system 1 of the present disclosure, which will be described below. An operation of controlling a plurality of valves according to displacement of the brake pedal 10 will be described below.

A driving force of the motor 120 generates a displacement of the hydraulic piston 114 through the power converter 130, and a hydraulic pressure generated while the hydraulic piston 114 slides inside the pressure chamber is delivered to the wheel cylinder 40 installed at each of the wheels RR, RL, FR, and FL through the first and second hydraulic flow paths 211 and 212.

The power converter 130 is a device configured to convert a rotational force into a rectilinear movement, and, as one example, it may be configured with a worm shaft 131, a worm wheel 132, and the drive shaft 133.

The worm shaft 131 may be integrally formed with a rotational shaft of the motor 120, and rotates the worm wheel 132 by being engaged therewith and coupled thereto through a worm that is formed on an outer circumferential surface of the worm shaft 131. The worm wheel 132 linearly moves the drive shaft 133 by being engaged therewith and coupled thereto, and the drive shaft 133 is connected to the hydraulic piston 114 to slide the hydraulic piston 114 inside the cylinder block 111.

To describe such operations again, a signal sensed by the pedal displacement sensor 11 when displacement occurs at the brake pedal 10 is transmitted to the ECU (not shown) and then the ECU drives the motor 120 in one direction to rotate the worm shaft 131 in the one direction. A rotational force of the worm shaft 131 is transmitted to the drive shaft 133 via the worm wheel 132, and then the hydraulic piston 114 connected to the drive shaft 133 is moved forward to generate a hydraulic pressure in the first pressure chamber 112.

On the other hand, when the pedal effort is released from the brake pedal 10, the ECU drives the motor 120 in a reverse direction, and thus the worm shaft 131 is reversely rotated. Consequently, the worm wheel 132 is also reversely rotated, and thus a negative pressure is generated in the first pressure chamber 112 while the hydraulic piston 114 connected to the drive shaft 133 is returned to its original position, that is, moved backward.

Meanwhile, it is possible for generation of the hydraulic pressure and the negative pressure to be opposite to that which is described above. That is, a signal sensed by the pedal displacement sensor 11 when displacement occurs at the brake pedal 10 is transmitted to the ECU (not shown) and then the ECU drives the motor 120 in a reverse direction to rotate the worm shaft 131 in the reverse direction. A rotational force of the worm shaft 131 is transmitted to the drive shaft 133 via the worm wheel 132, and then the hydraulic piston 114 connected to the drive shaft 133 is moved backward to generate a hydraulic pressure in the second pressure chamber 113.

On the other hand, when the pedal effort is released from the brake pedal 10, the ECU drives the motor 120 in one direction, and thus the worm shaft 131 is rotated in the one direction. Consequently, the worm wheel 132 is also reversely rotated, and thus a negative pressure is generated in the second pressure chamber 113 while the hydraulic piston 114 connected to the drive shaft 133 is returned to its original position, that is, moved forward.

As described above, the hydraulic pressure supply device 100 serves to deliver the hydraulic pressure to the wheel cylinders 40 or to suction and deliver the hydraulic pressure to the reservoir 30 according to a rotational direction of the rotational force generated from the motor 120.

Meanwhile, when the motor 120 is rotated in the one direction, the hydraulic pressure may be generated in the first pressure chamber 112 or the negative pressure may be generated in the second pressure chamber 113, and whether the hydraulic pressure is used for braking or the negative pressure is used for releasing braking may be determined through the control of the valves 54, 60, 221*a*, 221*b*, 221*c*, 221*d*, 222*a*, 222*b*, 222*c*, 222*d*, 233, 235, 236, and 243. This will be described in detail below.

Although not shown in the drawing, the power converter 130 may be configured with a ball screw nut assembly. For example, the power converter 130 may be configured with a screw which is integrally formed with the rotational shaft of the motor 120 or is connected to and rotated with the rotational shaft thereof, and a ball nut which is screw-coupled to the screw in a state in which rotation of the ball nut is restricted to perform a rectilinear movement according to rotation of the screw. The hydraulic piston 114 is connected to the ball nut of the power converter 130 to pressurize the pressure chamber by the rectilinear movement of the ball nut. Such a ball screw nut assembly is a device configured to convert a rotational movement into a rectilinear movement, and because a structure thereof is generally known in the related art, a detailed description thereof will be omitted.

Further, it should be understood that the power converter 130 according to the embodiment of the present disclosure may employ any structure capable of converting a rotational movement into a rectilinear movement in addition to the structure of the ball screw nut assembly.

Also, the electric brake system 1 according to the embodiment of the present disclosure may further include the first and second backup flow paths 251 and 252 capable of directly supplying oil discharged from the master cylinder 20 to the wheel cylinders 40 when the hydraulic pressure supply device 100 operates abnormally, that is, in a fallback mode.

The first cut valve 261 configured to control an oil flow may be provided at the first backup flow path 251, and the second cut valve 262 configured to control an oil flow may be provided at the second backup flow path 252. Also, the first backup flow path 251 may connect the first hydraulic pressure port 24*a* and the first hydraulic pressure circuit 201, and the second backup flow path 252 may connect the second hydraulic pressure port 24*b* and the second hydraulic pressure circuit 202.

Further, the first and second cut valves 261 and 262 may be configured with normally open type solenoid valves that are usually open and are closed when a closing signal is received from the ECU.

Next, the hydraulic pressure control unit 200 according to the embodiment of the present disclosure will be described with reference to FIG. 1.

The hydraulic pressure control unit 200 may be configured with the first hydraulic pressure circuit 201 and the second hydraulic pressure circuit 202 which each receive a hydraulic pressure and control two wheels. As one example, the first hydraulic pressure circuit 201 may control the front right wheel FR and the rear left wheel RL, and the second hydraulic pressure circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic pressure circuit 201 is connected to the first hydraulic flow path 211 and the second hydraulic flow path 212 to receive a hydraulic pressure supplied from the hydraulic pressure supply device 100, and the second hydraulic flow path 212 branches into two flow paths which are connected to the front right wheel FR and the rear left wheel RL. Similarly, the second hydraulic pressure circuit 202 is connected to the first hydraulic flow path 211 and the third hydraulic flow path 213 to receive the hydraulic pressure supplied from the hydraulic pressure supply device 100, and the third hydraulic flow path 213 branches into two flow paths which are connected to the front left wheel FL and the rear right wheel RR.

A plurality of inlet valves 221 (that is, 221a, 221b, 221c, and 221d) may be provided in the hydraulic pressure circuits 201 and 202 to control delivery of the hydraulic pressure. As one example, two inlet valves 221a and 221b may be provided at the first hydraulic pressure circuit 201 and connected to the first hydraulic flow path 211 to control the hydraulic pressure delivered to two of the wheel cylinders 40. Also, two inlet valves 221c and 221d may be provided at the second hydraulic pressure circuit 202 and connected to the second hydraulic flow path 212 to control the hydraulic pressure delivered to two of the wheel cylinders 40.

Further, the plurality of inlet valves 221 may be disposed at an upstream side of each of the wheel cylinders 40 and may be configured with normally open type solenoid valves that are usually open and are closed when a closing signal is received from the ECU.

Also, the hydraulic pressure circuits 201 and 202 may include check valves 223a, 223b, 223c, and 223d which are provided at a bypass flow path connecting a front side to a rear side of each of the inlet valves 221a, 221b, 221c, and 221d, respectively. Each of the check valves 223a, 223b, 223c, and 223d may be provided to allow oil to flow only in a direction from the wheel cylinder 40 to the hydraulic pressure supply unit 110 and block oil from flowing in a direction from the hydraulic pressure supply unit 110 to the wheel cylinder 40. Each of the check valves 223a, 223b, 223c, and 223d may be operated to rapidly discharge a braking pressure from the wheel cylinder 40, and allow the hydraulic pressure of the wheel cylinder 40 to be delivered to the hydraulic pressure supply unit 110 when the inlet valves 221a, 221b, 221c, and 221d are operated abnormally.

Also, a plurality of outlet valves 222 (that is, 222a, 222b, 222c, and 222d) connected to the reservoirs 30 may be further provided in the hydraulic pressure circuits 201 and 202 to improve brake release performance when braking is released. Each of the outlet valves 222 is connected to the wheel cylinder 40 to control discharging of the hydraulic pressure from each of the wheels RR, RL, FR, and FL. That is, when a braking pressure of each of the wheels RR, RL, FR, and FL is measured and decompression of the braking is determined as being required, the outlet valves 222 may be selectively open to control the braking pressure.

Further, the outlet valves 222 may be configured with normally closed type solenoid valves that are usually closed and are open when an opening signal is received from the ECU.

In addition, the hydraulic pressure control unit 200 may be connected to the backup flow paths 251 and 252. As one example, the first hydraulic pressure circuit 201 may be connected to the first backup flow path 251 to receive the hydraulic pressure provided from the master cylinder 20, and the second hydraulic pressure circuit 202 may be connected to the second backup flow path 252 to receive the hydraulic pressure provided from the master cylinder 20.

At this point, the first backup flow path 251 may be connected to the first hydraulic pressure circuit 201 at an upstream side of each of the first and second inlet valves 221a and 221b. Similarly, the second backup flow path 252 may be connected to the second hydraulic pressure circuit 202 at an upstream side of each of the third and fourth inlet valves 221c and 221d. Consequently, when the first and second cut valves 261 and 262 are closed, the hydraulic pressure provided from the hydraulic pressure supply device 100 may be supplied to the wheel cylinders 40 through the first and second hydraulic pressure circuits 201 and 202, and when the first and second cut valves 261 and 262 are open, the hydraulic pressure provided from the master cylinder 20 may be supplied to the wheel cylinders 40 through the first and second backup flow paths 251 and 252. At this point, since the plurality of inlet valves 221a, 221b, 221c, and 221d are in an open state, there is no need to switch their operation states.

Meanwhile, an undescribed reference number "PS11" is a first hydraulic flow path pressure sensor configured to sense a hydraulic pressure of the first hydraulic pressure circuit 201, an undescribed reference number "PS12" is a second hydraulic flow path pressure sensor configured to sense a hydraulic pressure of the second hydraulic pressure circuit 202, and an undescribed reference number "PS2" is a backup flow path pressure sensor configured to sense an oil pressure of the master cylinder 20. Further, an undescribed reference number "MPS" is a motor control sensor configured to control a rotational angle or a current of the motor 120.

Hereinafter, an operation of the electric brake system 1 according to the embodiment of the present disclosure will be described in detail.

The hydraulic pressure supply device 100 may discriminately operate in a low pressure mode and a high pressure mode. The low pressure mode and the high pressure mode can be interchanged with each other by changing an operation of the hydraulic pressure control unit 200. The hydraulic pressure supply device 100 may operate in the high pressure mode, thereby generating a high hydraulic pressure without increasing an output of the motor 120. Therefore, a stable braking force may be secured and cost and weight of a brake system may be reduced.

To describe in more detail, a hydraulic pressure is generated in the first pressure chamber 112 while the hydraulic piston 114 is moved forward. As the hydraulic piston 114 is moved forward in an initial stage, that is, a stroke of the hydraulic piston 114 is increased, an amount of oil delivered from the first pressure chamber 112 to the wheel cylinders 40 is increased to raise a braking pressure. However, since there is an active stroke of the hydraulic piston 114, a maximum pressure due to the forward movement of the hydraulic piston 114 exists.

At this point, a maximum pressure in the low pressure mode is less than that in the high pressure mode. However, comparing the high pressure mode with the low pressure mode, an increase rate in pressure per stroke of the hydraulic piston 114 in the high pressure mode is less than that in the low pressure mode. This is because a portion of oil discharged from the first pressure chamber 112 flows in the second pressure chamber 113 instead of the discharged oil entirely flowing in the wheel cylinders 40. This will be described in detail with reference to FIG. 5.

Therefore, the low pressure mode in which an increase rate in pressure per stroke is large may be executed at an initial stage of braking where braking responsiveness is important, whereas the high pressure mode in which a maximum pressure is large may be executed at a post-initial stage of braking where a maximum braking force is important.

Figure 4:
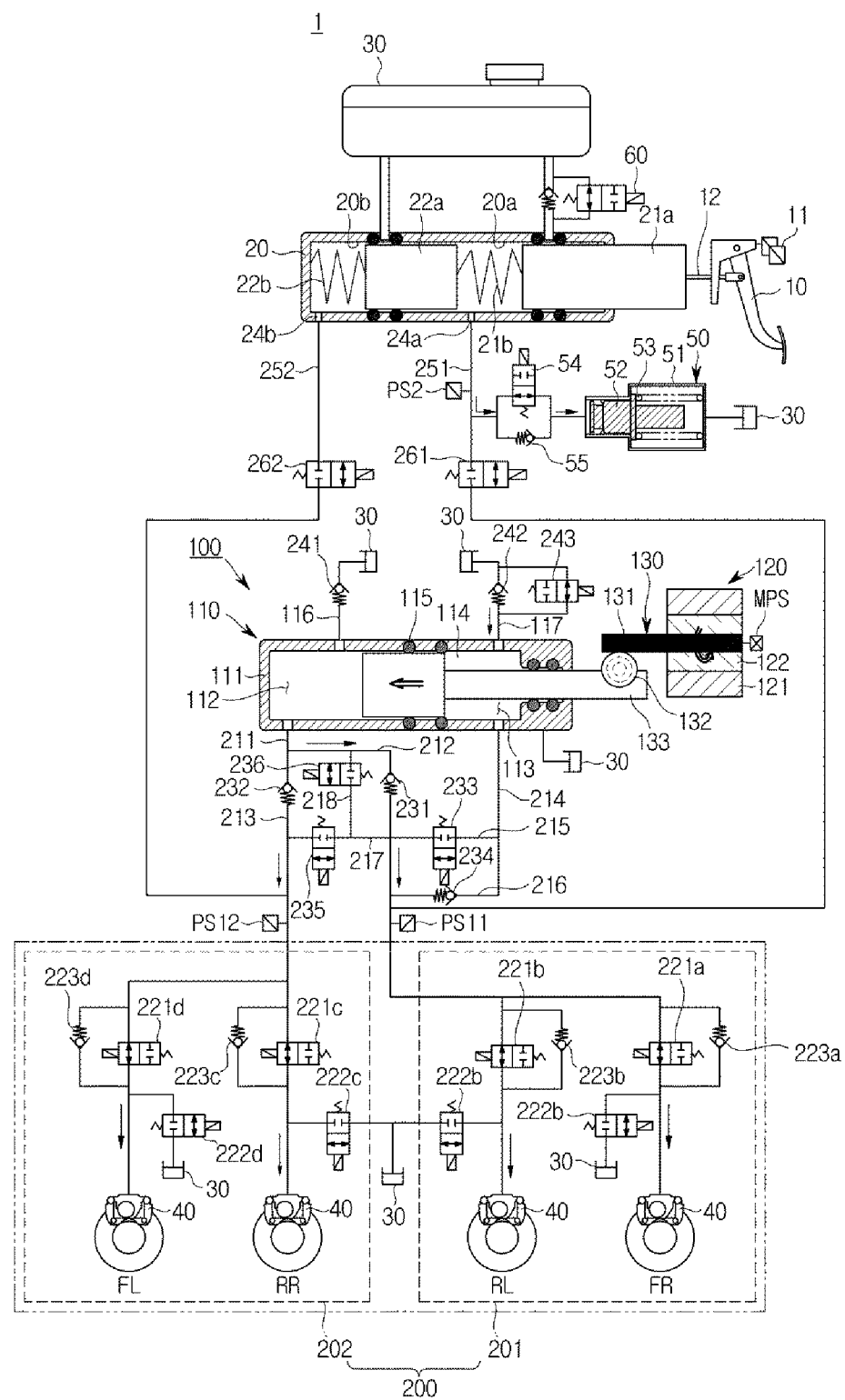
FIG. 4 is a hydraulic pressure circuit diagram illustrating a situation in which a braking pressure is provided in a low pressure mode while a hydraulic piston is moved forward.
Figure 5:
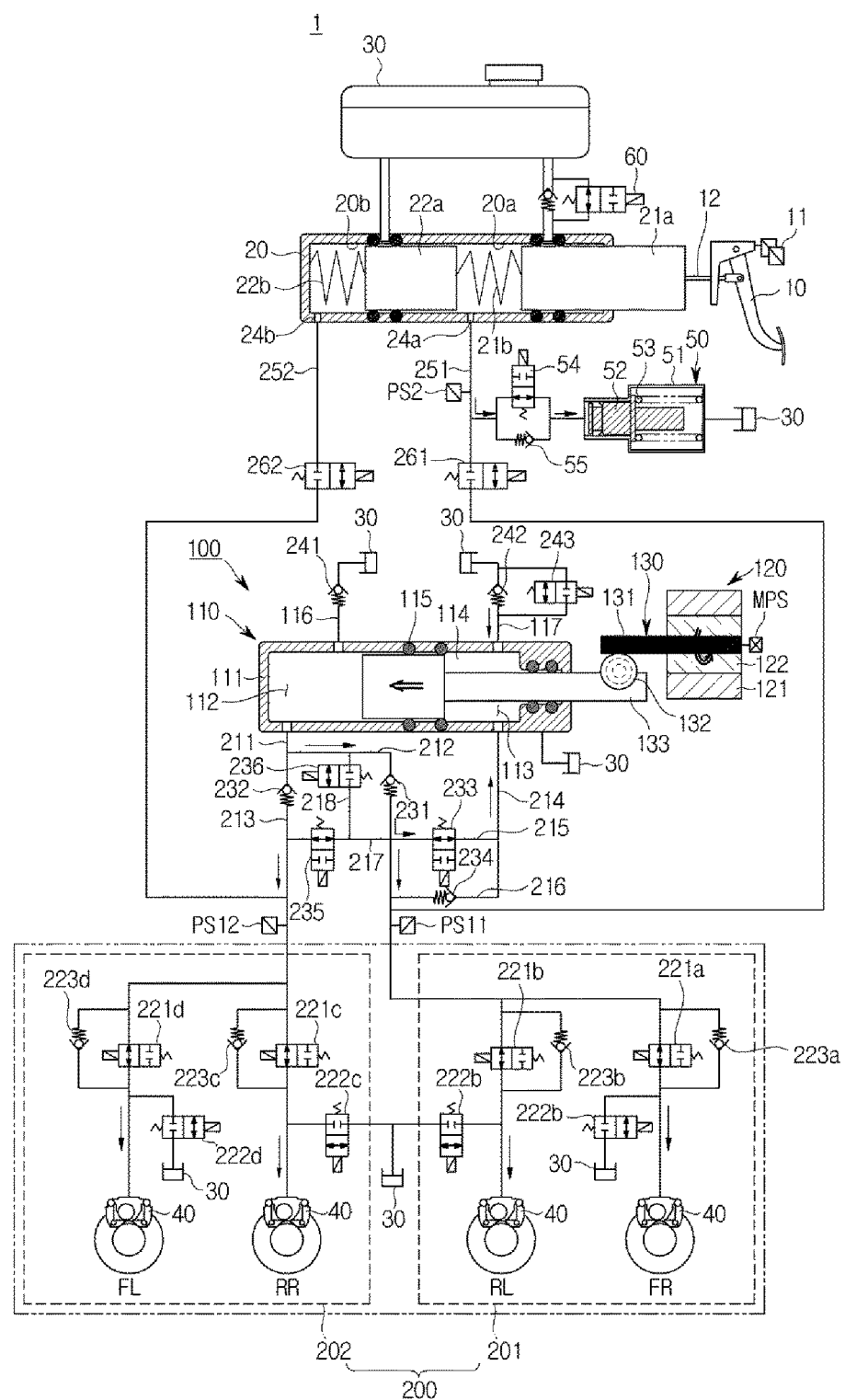
FIG. 5 is a hydraulic pressure circuit diagram illustrating a situation in which a braking pressure is provided in a high pressure mode while the hydraulic piston is moved forward.

FIG. 4 is a hydraulic pressure circuit diagram illustrating a situation in which a braking pressure is provided in the low pressure mode while the hydraulic piston 114 is moved forward, and FIG. 5 is a hydraulic pressure circuit diagram illustrating a situation in which a braking pressure is provided in the high pressure mode while the hydraulic piston 114 is moved forward.

When braking is begun by a driver, an amount of braking requested by the driver may be sensed through the pedal displacement sensor 11 on the basis of information including a pressure applied to the brake pedal 10 by the driver, and the like. The ECU receives an electrical signal output from the pedal displacement sensor 11 to drive the motor 120.

Also, the ECU may receive an amount of regenerative braking through the backup flow path pressure sensor PS2 provided at an outlet side of the master cylinder 20 and the second hydraulic flow path pressure sensor PS12 provided at the second hydraulic pressure circuit 202, and may calculate an amount of braking friction on the basis of a difference between the amount of braking requested by the driver and the amount of regenerative braking, thereby determining the magnitude of an increase or reduction of a pressure at the wheel cylinder 40.

Referring to FIG. 4, when the driver steps on the brake pedal 10 at an initial stage of braking, the motor 120 operates to rotate in one direction, and a rotational force of the motor 120 is delivered to the hydraulic pressure supply unit 110 by the power converter 130, and thus the hydraulic pressure is generated in the first pressure chamber 112 while the hydraulic piston 114 of the hydraulic pressure supply unit 110 is moved forward. The hydraulic pressure discharged from the hydraulic pressure supply unit 110 is delivered to the wheel cylinder 40 provided at each of the four wheels through the first hydraulic pressure circuit 201 and the second hydraulic pressure circuit 202 to generate a braking force.

Specifically, the hydraulic pressure provided from the first pressure chamber 112 is directly delivered to the wheel cylinders 40 provided at the two wheels FR and RL through the first hydraulic flow path 211 and the second hydraulic flow path 212 which are connected to the first communicating hole 111a. At this point, the first and second inlet valves 221a and 221b, which are installed at two flow paths branching from the second hydraulic flow path 212, are provided in an open state. Also, the first and second outlet valves 222a and 222b installed at flow paths branching from the two flow paths, which branch from the second hydraulic flow path 212, are maintained in the closed state to prevent the hydraulic pressure from leaking into the reservoir 30.

Further, the hydraulic pressure provided from the first pressure chamber 112 is directly delivered to the wheel cylinders 40 provided at the two wheels RR and FL through the first hydraulic flow path 211 and the third hydraulic flow path 213 which are connected to the first communicating hole 111a. At this point, the third and fourth inlet valves 221c and 221d, which are installed at two flow paths branching from the third hydraulic flow path 213, are provided in an open state. Also, the third and fourth outlet valves 222c and 222d installed at flow paths branching from the two flow paths, which branch from the third hydraulic flow path 213, are maintained in a closed state to prevent the hydraulic pressure from leaking into the reservoir 30.

Further, the fifth control valve 235 and the sixth control valve 236 may be switched to an open state, thereby opening the seventh hydraulic flow path 217 and the eighth hydraulic flow path 218. The seventh hydraulic flow path 217 and the eighth hydraulic flow path 218 are opened so that the second hydraulic flow path 212 and the third hydraulic flow path 213 communicate with each other. However, one or more of the fifth control valve 235 and the sixth control valve 236 may be maintained in the closed state as necessary.

Further, the third control valve 233 may be maintained in the closed state, thereby blocking the fifth hydraulic flow path 215. The hydraulic pressure generated in the first pressure chamber 112 may be blocked from being delivered to the second pressure chamber 113 through the fifth hydraulic flow path 215 connected to the second hydraulic flow path 212 such that an increase rate in pressure per stroke may be improved. Therefore, a rapid braking response may be expected in the initial stage of braking.

In addition, when the hydraulic pressure delivered to each of the wheel cylinders 40 is measured as being higher than a target pressure value according to the pedal effort of the brake pedal 10, one or more among the first to fourth outlet valves 222 may be opened to control the hydraulic pressure to converge on the target pressure value.

Also, when the hydraulic pressure is generated in the hydraulic pressure supply device 100, the first and second cut valves 261 and 262, which are installed at the first and second backup flow paths 251 and 252 connected to the first and second hydraulic pressure ports 24a and 24b of the master cylinder 20, are closed so that the hydraulic pressure discharged from the master cylinder 20 is not delivered to the wheel cylinders 40.

Also, the hydraulic pressure generated by pressurization of the master cylinder 20 according to the pedal effort of the brake pedal 10 is delivered to the simulation device 50 connected to the master cylinder 20. At this point, the simulator valve 54, which is installed at the rear end part of the simulation chamber 51 and is a normally closed type valve, is opened so that the oil filled in the simulation chamber 51 is delivered to the reservoir 30 through the simulator valve 54. Also, the reaction force piston 52 is moved, and a pressure corresponding to a reaction force of the reaction force spring 53 supporting the reaction force piston 52 is formed inside the simulation chamber 51 so that an appropriate pedal feeling is provided to the driver.

Also, the first hydraulic flow path pressure sensor PS11 installed at the second hydraulic flow path 212 may detect a flow rate delivered to the wheel cylinder 40 installed at the front right wheel FR or the rear left wheel RL (hereinafter, simply referred to as the wheel cylinder 40). Therefore, the hydraulic pressure supply device 100 may be controlled according to an output of the first hydraulic flow path pressure sensor PS11 to control a flow rate delivered to the wheel cylinder 40. Specifically, a distance and a speed of the forward movement of the hydraulic piston 114 may be adjusted so that a flow rate discharged from the wheel cylinder 40 and a discharge speed thereof may be controlled.

Meanwhile, the low pressure mode shown in FIG. 4 may be switched to the high pressure mode shown in FIG. 5 before the hydraulic piston 114 is maximally moved forward.

Referring to FIG. 5, in the high pressure mode, the third control valve 233 may be switched to an open state to open the fifth hydraulic flow path 215. Accordingly, the hydraulic pressure generated in the first pressure chamber 112 may be delivered to the second pressure chamber 113 through the fifth hydraulic flow path 215 connected to the second hydraulic flow path 212, and thus may be used to push the hydraulic piston 114.

In the high pressure mode, since a portion of the oil discharged from the first pressure chamber 112 flows in the second pressure chamber 113, an increase rate in pressure per stroke is decreased. However, since a portion of the hydraulic pressure generated in the first pressure chamber 112 is used to push the hydraulic piston 114, a maximum pressure is increased. At this point, the reason for an increase of the maximum pressure is that a volume per stroke of the hydraulic piston 114 in the second pressure chamber 113 is less than that of the hydraulic piston 114 in the first pressure chamber 112.

Figure 6:
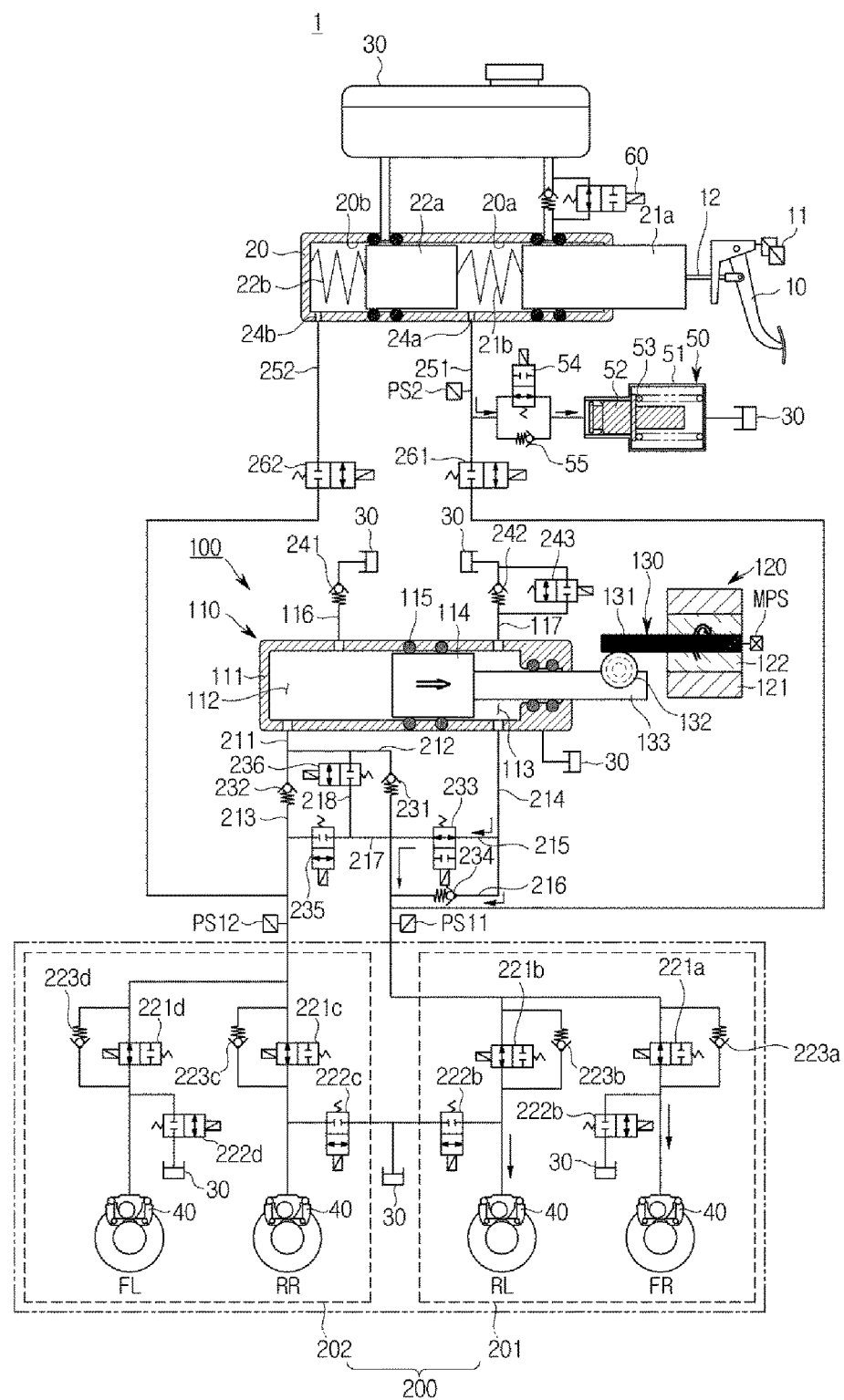
FIG. 6 is a hydraulic pressure circuit diagram illustrating a situation in which a braking pressure is provided while the hydraulic piston is moved backward.

FIG. 6 is a hydraulic pressure circuit diagram illustrating a situation in which a braking pressure is provided while the hydraulic piston 114 is moved backward.

Referring to FIG. 6, when the driver steps on the brake pedal 10 at an initial stage of braking, the motor 120 operates to rotate in a reverse direction, and a rotational force of the motor 120 is delivered to the hydraulic pressure supply unit 110 by the power converter 130, and thus a hydraulic pressure is generated in the second pressure chamber 113 while the hydraulic piston 114 of the hydraulic pressure supply unit 110 is moved forward. The hydraulic pressure discharged from the hydraulic pressure supply unit 110 is delivered to the wheel cylinder 40 provided at each of the four wheels through the first hydraulic pressure circuit 201 and the second hydraulic pressure circuit 202 to generate a braking force.

Specifically, the hydraulic pressure provided from the second pressure chamber 113 is directly delivered to the wheel cylinders 40 provided at the two wheels FR and RL through the fourth hydraulic flow path 214 and the fifth hydraulic flow path 215 which are connected to the second communicating hole 111b. At this point, the first and second inlet valves 221a and 221b, which are installed at two flow paths branching from the fifth hydraulic flow path 215, are provided in an open state. Also, the first and second outlet valves 222a and 222b installed at flow paths branching off from the two flow paths, which branch from the second hydraulic flow path 212, are maintained in the closed state to prevent the hydraulic pressure from leaking into the reservoir 30.

Further, the hydraulic pressure provided from the second pressure chamber 113 is directly delivered to the wheel cylinders 40 provided at the two wheels RR and FL through the fourth hydraulic flow path 214 and the sixth hydraulic flow path 216 which are connected to the second communicating hole 111b. At this point, the third and fourth inlet valves 221c and 221d, which are installed at two flow paths branching from the sixth hydraulic flow path 216, are provided in an open state. Also, the third and fourth outlet valves 222c and 222d installed at flow paths branching from the two flow paths, which branch from the sixth hydraulic flow path 216, are maintained in the closed state to prevent the hydraulic pressure from leaking into the reservoir 30.

Further, the third control valve 233 may be switched to an open state, thereby opening the fifth hydraulic flow path 215. Meanwhile, the fourth control valve 234 is configured with a check valve enabling a hydraulic pressure to be delivered in a direction from the second pressure chamber 113 to the wheel cylinders 40 so that the sixth hydraulic flow path 216 is open.

Further, the sixth control valve 236 may be maintained in the closed state, thereby blocking the eighth hydraulic flow path 218. The hydraulic pressure generated in the second pressure chamber 113 may be blocked from being delivered to the first pressure chamber 112 through the eighth hydraulic flow path 218 connected to the fifth hydraulic flow path 215 such that an increase rate in pressure per stroke may be improved. Therefore, a rapid braking response may be expected in the initial stage of braking.

Next, a case of releasing the braking force in the braking state established when the electric brake system 1 according to the embodiment of the present disclosure operates normally will be described.

Figure 7:
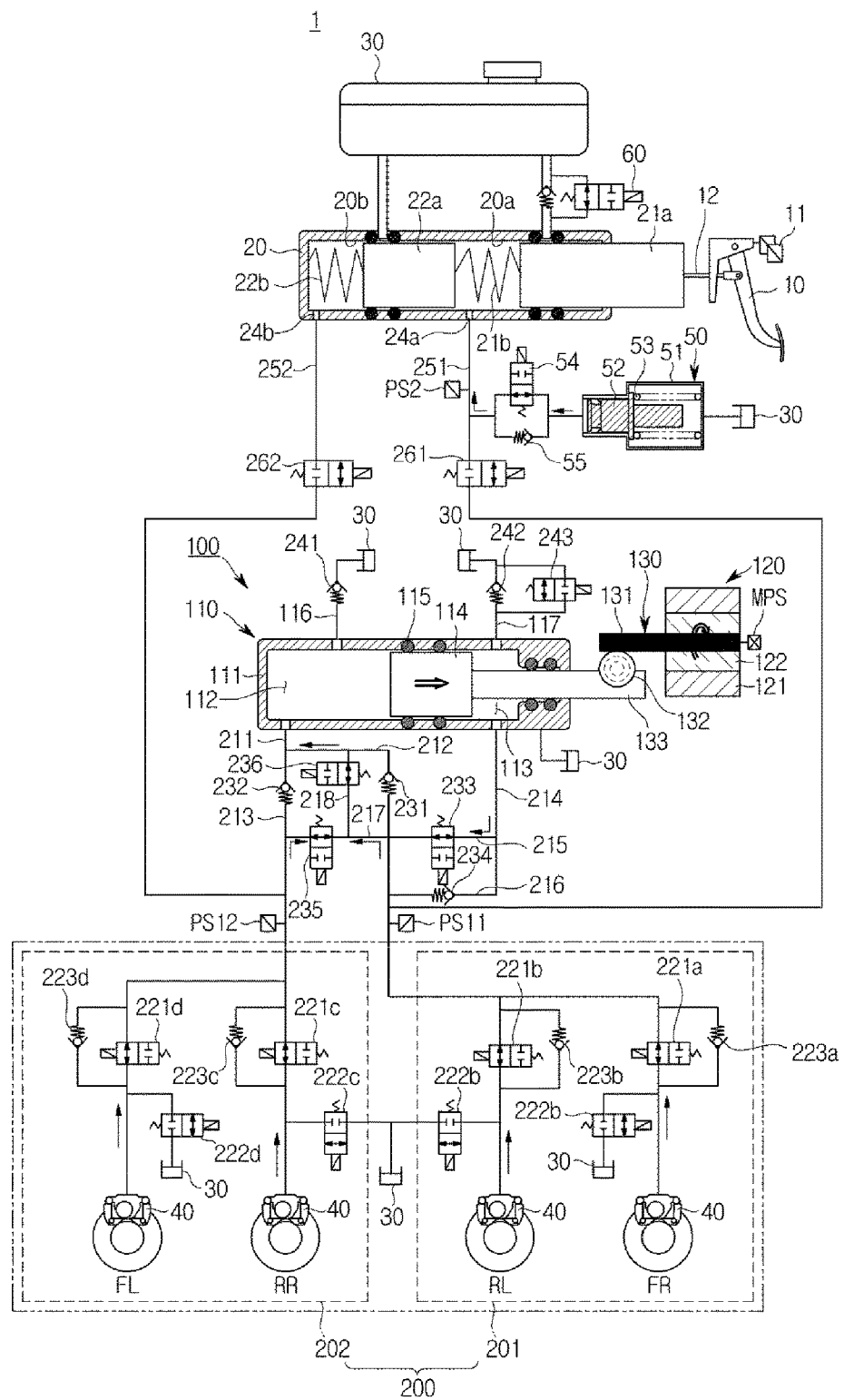
FIG. 7 is a hydraulic pressure circuit diagram illustrating a situation in which a braking pressure is released in a high pressure mode while the hydraulic piston is moved backward.
Figure 8:
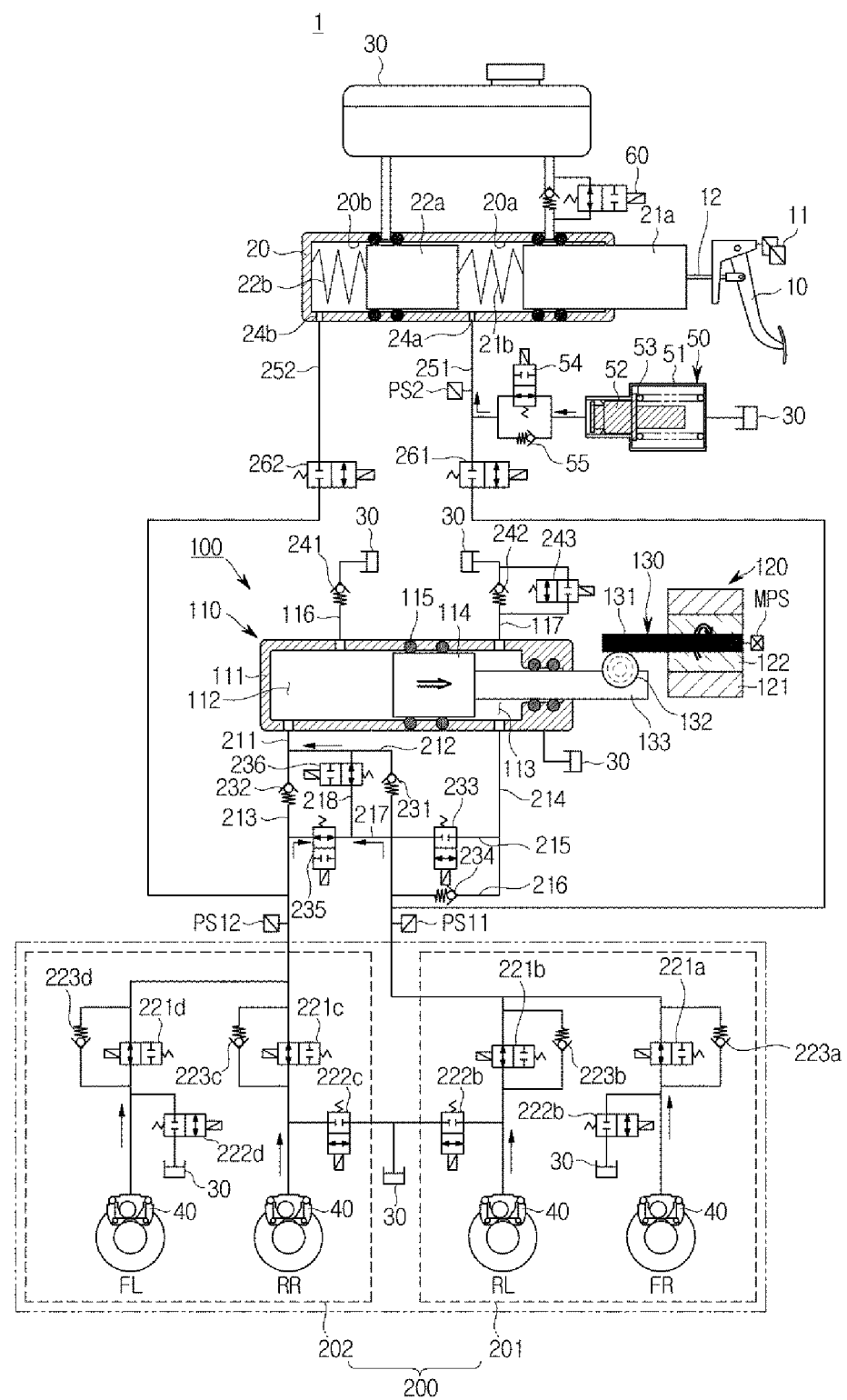
FIG. 8 is a hydraulic pressure circuit diagram illustrating a situation in which a braking pressure is released in a low pressure mode while the hydraulic piston is moved backward.

FIG. 7 is a hydraulic pressure circuit diagram illustrating a situation in which a braking pressure is released in the high pressure mode while the hydraulic piston 114 is moved backward, and FIG. 8 is a hydraulic pressure circuit diagram illustrating a situation in which a braking pressure is released in the low pressure mode while the hydraulic piston 114 is moved backward.

Referring to FIG. 7, when pedal effort applied to the brake pedal 10 is released, the motor 120 generates a rotational force in a reverse direction compared to that when the braking operation is performed to deliver the generated rotational force to the power converter 130, and the worm shaft 131 of the power converter 130, the worm wheel 132 thereof, and the drive shaft 133 thereof are rotated in a reverse direction compared to that when the braking operation is performed to move backward and return the hydraulic piston 114 to its original position, thereby releasing the pressure of the first pressure chamber 112 or generating a negative pressure therein. Further, the hydraulic pressure supply unit 110 receives the hydraulic pressure discharged from the wheel cylinders 40 through the first and second hydraulic pressure circuits 201 and 202 to deliver the received hydraulic pressure to the first pressure chamber 112.

Specifically, the negative pressure generated in the first pressure chamber 112 causes the hydraulic pressure of each of the wheel cylinders 40 provided at the two wheels FR and RL to be released through the first hydraulic flow path 211 and the second hydraulic flow path 212 which are connected to the first communicating hole 111a. At this point, the first and second inlet valves 221a and 221b, which are installed at two flow paths branching from the second hydraulic flow path 212, are provided in an open state. Also, the first and second outlet valves 222a and 222b installed at flow paths branching from the two flow paths, which branch from the second hydraulic flow path 212, are maintained in the closed state to prevent oil in the reservoir 30 from flowing therein.

Further, the negative pressure generated in the first pressure chamber 112 causes the hydraulic pressure of each of the wheel cylinders 40 provided at the two wheels FL and RR to be released through the first hydraulic flow path 211 and the third hydraulic flow path 213 which are connected to the first communicating hole 111a. At this point, the third and fourth inlet valves 221c and 221d, which are installed at two flow paths branching from the third hydraulic flow path 213, are provided in an open state. Also, the third and fourth outlet valves 222c and 222d installed at flow paths branching from the two flow paths, which branch from the third hydraulic flow path 213, are maintained in the closed state to prevent oil in the reservoir 30 from flowing in.

Further, the third control valve 233 may be switched to an open state to open the fifth hydraulic flow path 215, the fifth control valve 235 may be switched to an open state to open the seventh hydraulic flow path 217, and the sixth control valve 236 may be switched to an open state to open the eighth hydraulic flow path 218. The fifth hydraulic flow path 215, the seventh hydraulic flow path 217, and the eighth hydraulic flow path 218 communicate with one another so that the first pressure chamber 112 and the second pressure chamber 113 communicate with each other.

The hydraulic piston 114 should be moved backward to generate the negative pressure in the first pressure chamber 112, and when the oil is entirely filled in the second pressure chamber 113, resistance occurs while the hydraulic piston 114 is moved backward. At this point, when the third control valve 233, the fifth control valve 235, and the sixth control valve 236 are open to enable the fourth hydraulic flow path 214 and the fifth hydraulic flow path 215 to communicate with the second hydraulic flow path 212 and the first hydraulic flow path 211, the oil in the second pressure chamber 113 is moved to the first pressure chamber 112.

Further, the third dump valve 243 may be switched to a closed state. The third dump valve 243 is closed so that the oil in the second pressure chamber 113 may be discharged through only the fourth hydraulic flow path 214. However, in some cases, the third dump valve 243 may be maintained in the open state so that the oil in the second pressure chamber 113 may flow in the reservoir 30.

Also, when the negative pressure delivered to the first and second hydraulic pressure circuits 201 and 202 is measured as being higher than a target pressure releasing value according to an amount of release of the brake pedal 10, one or more among the first to fourth outlet valves 222 may be opened to control the negative pressure to converge on the target pressure releasing value.

Also, when the hydraulic pressure is generated in the hydraulic pressure supply device 100, the first and second cut valves 261 and 262, which are installed at the first and second backup flow paths 251 and 252, respectively, connected to the first and second hydraulic pressure ports 24a and 24b, respectively, of the master cylinder 20, are closed so that the negative pressure generated in the master cylinder 20 is not delivered to the hydraulic pressure control unit 200.

In the high pressure mode shown in FIG. 7, the oil in the second pressure chamber 113 is moved to the first pressure chamber 112 together with the oil in the wheel cylinder 40 by the negative pressure in the first pressure chamber 112, which is generated while the hydraulic piston 114 is moved backward, so that a pressure decrease rate of the wheel cylinder 40 is small. Therefore, a rapid pressure release may be difficult in the high pressure mode.

For this reason, the high pressure mode may be executed in only a high pressure situation, and may be switched to the low pressure mode shown in FIG. 7 when a pressure is lowered below a predetermined level.

Referring to FIG. 8, in the low pressure mode, the third dump valve 243 is maintained in or switched to the open state rather than the third control valve 233 being maintained in or switched to the closed state to block the fifth hydraulic flow path 215 such that the second pressure chamber 113 may be connected to the reservoir 30.

In the low pressure mode, since the negative pressure generated in the first pressure chamber 112 is used only to suction oil stored in the wheel cylinders 40, a decrease rate in pressure per stroke of the hydraulic piston 114 is increased compared to the high pressure mode.

Unlike FIG. 8, even when the hydraulic piston 114 is moved in a reverse direction, that is, moved forward, a braking force of the wheel cylinder 40 may be released.

Figure 9:
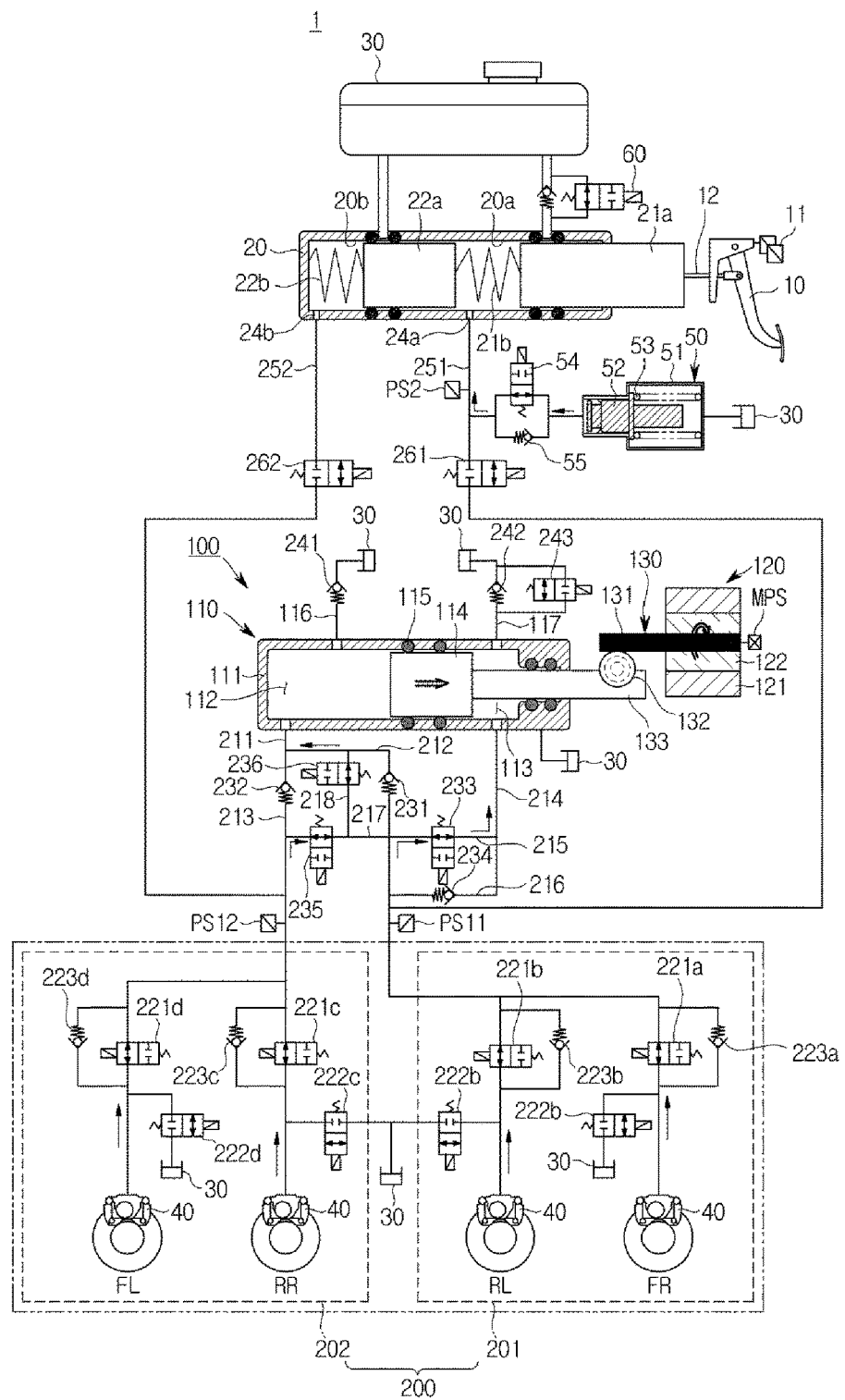
FIG. 9 is a hydraulic pressure circuit diagram illustrating a situation in which a braking pressure is released while the hydraulic piston is moved forward.

FIG. 9 is a hydraulic pressure circuit diagram illustrating a situation in which a braking pressure is released while the hydraulic piston 114 is moved forward.

Referring to FIG. 9, when pedal effort applied to the brake pedal 10 is released, the motor 120 generates a rotational force in a reverse direction compared to that when the braking operation is performed to deliver the generated rotational force to the power converter 130, and the worm shaft 131 of the power converter 130, the worm wheel 132 thereof, and the drive shaft 133 thereof are rotated in a reverse direction compared to that when the braking operation is performed to move forward and return the hydraulic piston 114 to its original position, thereby releasing the pressure of the first pressure chamber 113 or generating a negative pressure therein. Further, the hydraulic pressure supply unit 110 receives the hydraulic pressure discharged from the wheel cylinders 40 through the first and second hydraulic pressure circuits 201 and 202 to deliver the received hydraulic pressure to the second pressure chamber 113.

Specifically, the negative pressure generated in the second pressure chamber 113 causes the hydraulic pressure of each of the wheel cylinders 40 provided at the two wheels FR and RL to be released through the fourth hydraulic flow path 214, the fifth hydraulic flow path 215, and the second hydraulic flow path 212 which are connected to the second communicating hole 111b. At this point, the first and second inlet valves 221a and 221b, which are installed at two flow paths branching from the second hydraulic flow path 212, are provided in an open state. Also, the first and second outlet valves 222a and 222b installed at flow paths branching from the two flow paths, which branch from the second hydraulic flow path 212, are maintained in the closed state to prevent oil in the reservoir 30 from flowing in.

Further, the negative pressure generated in the second pressure chamber 113 causes the hydraulic pressure of each of the wheel cylinders 40 provided at the two wheels FL and RR to be released through the fourth hydraulic flow path 214, the fifth hydraulic flow path 215, the seventh hydraulic flow path 217, and the third hydraulic flow path 213 which are connected to the second communicating hole 111b. At this point, the third and fourth inlet valves 221c and 221d, which are installed at two flow paths branching from the third hydraulic flow path 213, are provided in an open state. Also, the third and fourth outlet valves 222c and 222d installed at flow paths branching from the two flow paths, which branch from the third hydraulic flow path 213, are maintained in the closed state to prevent oil in the reservoir 30 from flowing in.

Further, the third control valve 233 may be switched to an open state to open the fifth hydraulic flow path 215, and the fifth control valve 235 may be switched to an open state to open the seventh hydraulic flow path 217.

Also, when the negative pressure delivered to the first and second hydraulic pressure circuits 201 and 202 is measured as being higher than a target pressure releasing value according to an amount of release of the brake pedal 10, one or more among the first to fourth outlet valves 222 may be opened to control the negative pressure to converge on the target pressure releasing value.

Also, when the hydraulic pressure is generated in the hydraulic pressure supply device 100, the first and second cut valves 261 and 262, which are installed at the first and second backup flow paths 251 and 252, respectively, connected to the first and second hydraulic pressure ports 24a and 24b, respectively, of the master cylinder 20, are closed so that the negative pressure generated in the master cylinder 20 is not delivered to the hydraulic pressure control unit 200.

Also, the first hydraulic flow path pressure sensor PS11 installed at the second hydraulic flow path 212 may detect a flow rate discharged from the wheel cylinder 40 installed at the front right wheel FR or the rear left wheel RL. Therefore, the hydraulic pressure supply device 100 may be controlled according to an output of the first hydraulic flow path pressure sensor PS11 to control a flow rate discharged from the wheel cylinder 40. Specifically, a distance and a speed of the forward movement of the hydraulic piston 114 may be adjusted so that a flow rate of discharge from the wheel cylinder 40 and a discharge speed thereof may be controlled.

Figure 10:
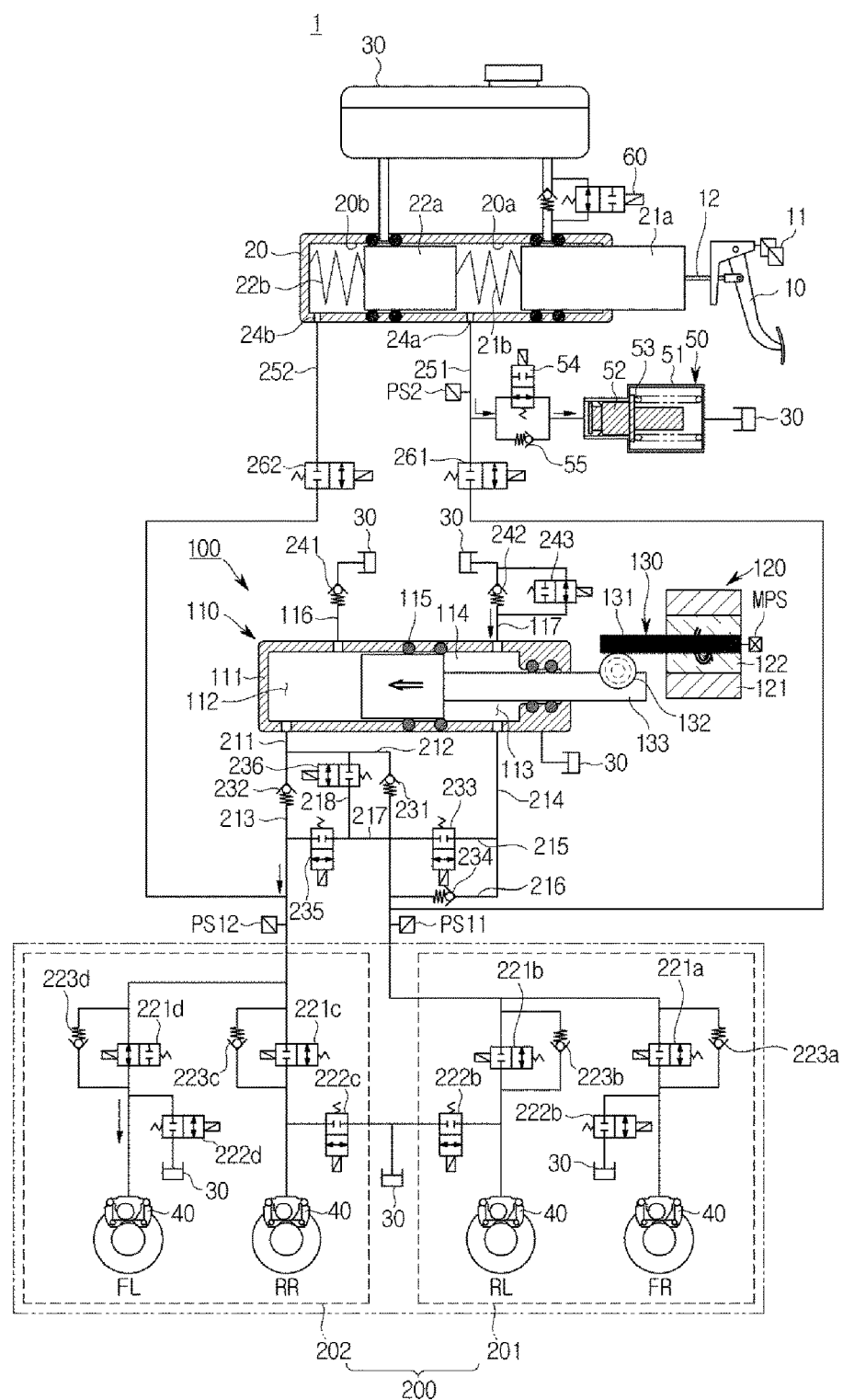
FIGS. 10 and 11 illustrate a state in which an anti-lock brake system (ABS) is operated through the electric brake system according to an embodiment of the present disclosure.
Figure 11:
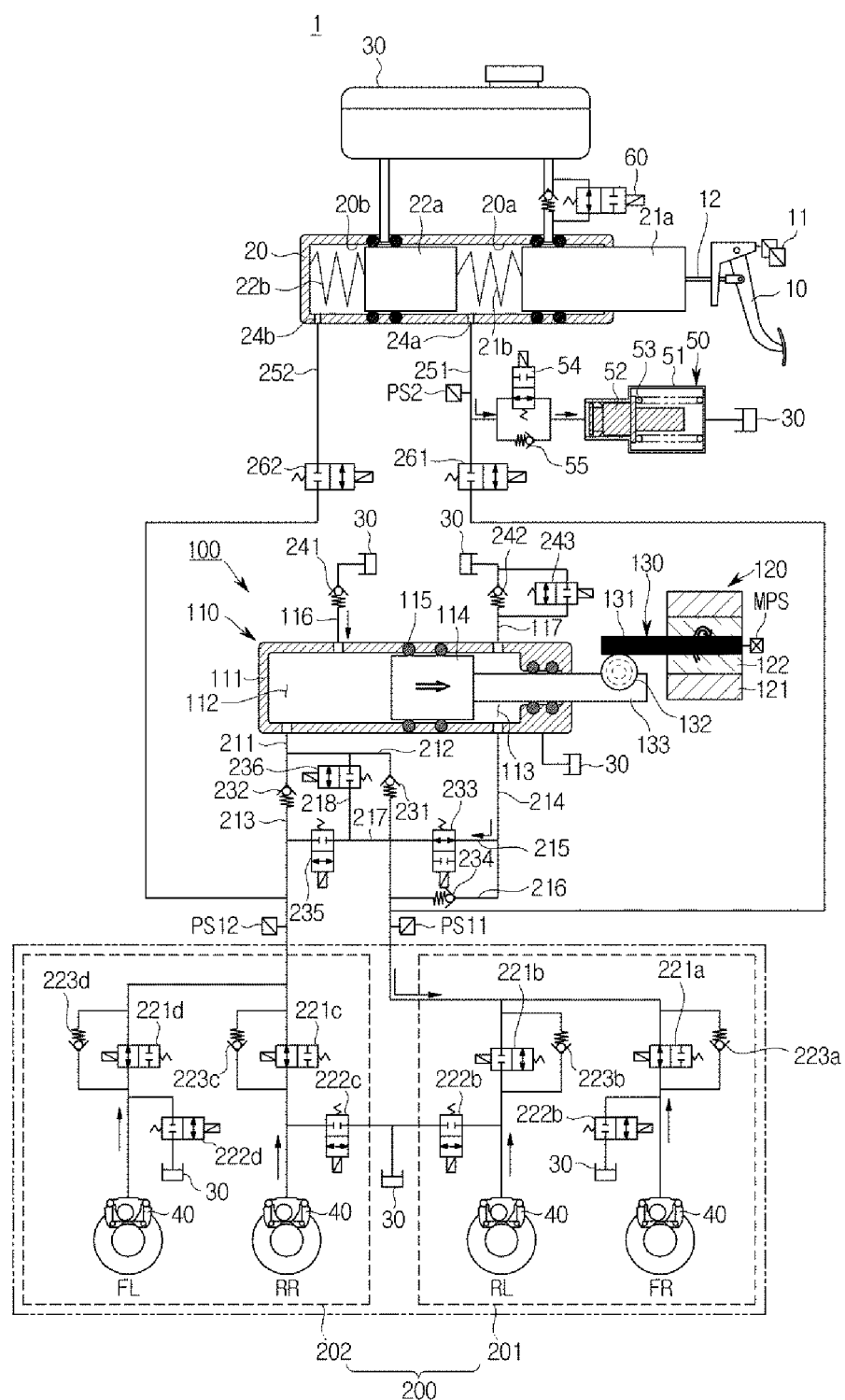

FIGS. 10 and 11 show a state in which an anti-lock brake system (ABS) is operated through the electric brake system 1 according to the embodiment of the present disclosure, FIG. 10 is a hydraulic pressure circuit diagram illustrating a situation in which the hydraulic piston 114 is moved forward and selective braking is performed, and FIG. 11 is a hydraulic pressure circuit diagram illustrating a situation in which the hydraulic piston 114 is moved backward and selective braking is performed.

When the motor 120 operates according to pedal effort of the brake pedal 10, a rotational force of the motor 120 is transmitted to the hydraulic pressure supply unit 110 through the power converter 130, thereby generating a hydraulic pressure. At this point, the first and second cut valves 261 and 262 are closed and thus the hydraulic pressure discharged from the master cylinder 20 is not delivered to the wheel cylinders 40.

Referring to FIG. 10, since a hydraulic pressure is generated in the first pressure chamber 112 while the hydraulic piston 114 is moved forward and the fourth inlet valve 221d is provided in the open state, the hydraulic pressure delivered through the first hydraulic flow path 211 and the third hydraulic flow path 213 operates the wheel cylinder 40 located at the front left wheel FL to generate a braking force.

At this point, the first to third inlet valves 221a, 221b, and 221c are switched to a closed state and the first to fourth outlet valves 222a, 222b, 222c, and 222d are maintained in the closed state. Further, the third dump valve 243 is provided in an open state, and thus the second pressure chamber 113 is filled with the oil flowing from the reservoir 30.

Referring to FIG. 11, since a hydraulic pressure is generated in the second pressure chamber 113 while the hydraulic piston 114 is moved backward and the first inlet valve 221a is provided in the open state, the hydraulic pressure delivered through the fourth hydraulic flow path 214 and the second hydraulic flow path 212 operates the wheel cylinder 40 located at the front right wheel FR to generate a braking force.

At this point, the second to fourth inlet valves 221b, 221c, and 221d are switched to a closed state and the first to fourth outlet valves 222a, 222b, 222c, and 222d are maintained in the closed state.

That is, the electric brake system 1 according to the embodiment of the present disclosure may independently control operations of the motor 120 and each of the valves 54, 60, 221a, 221b, 221c, 221d, 222a, 222b, 222c, 222d, 233, 235, 236, and 243 to selectively deliver or discharge the hydraulic pressure to or from the wheel cylinder 40 of each of the wheels RL, RR, FL, and FR according to a required pressure such that precise control of the hydraulic pressure may be possible.

Figure 12:
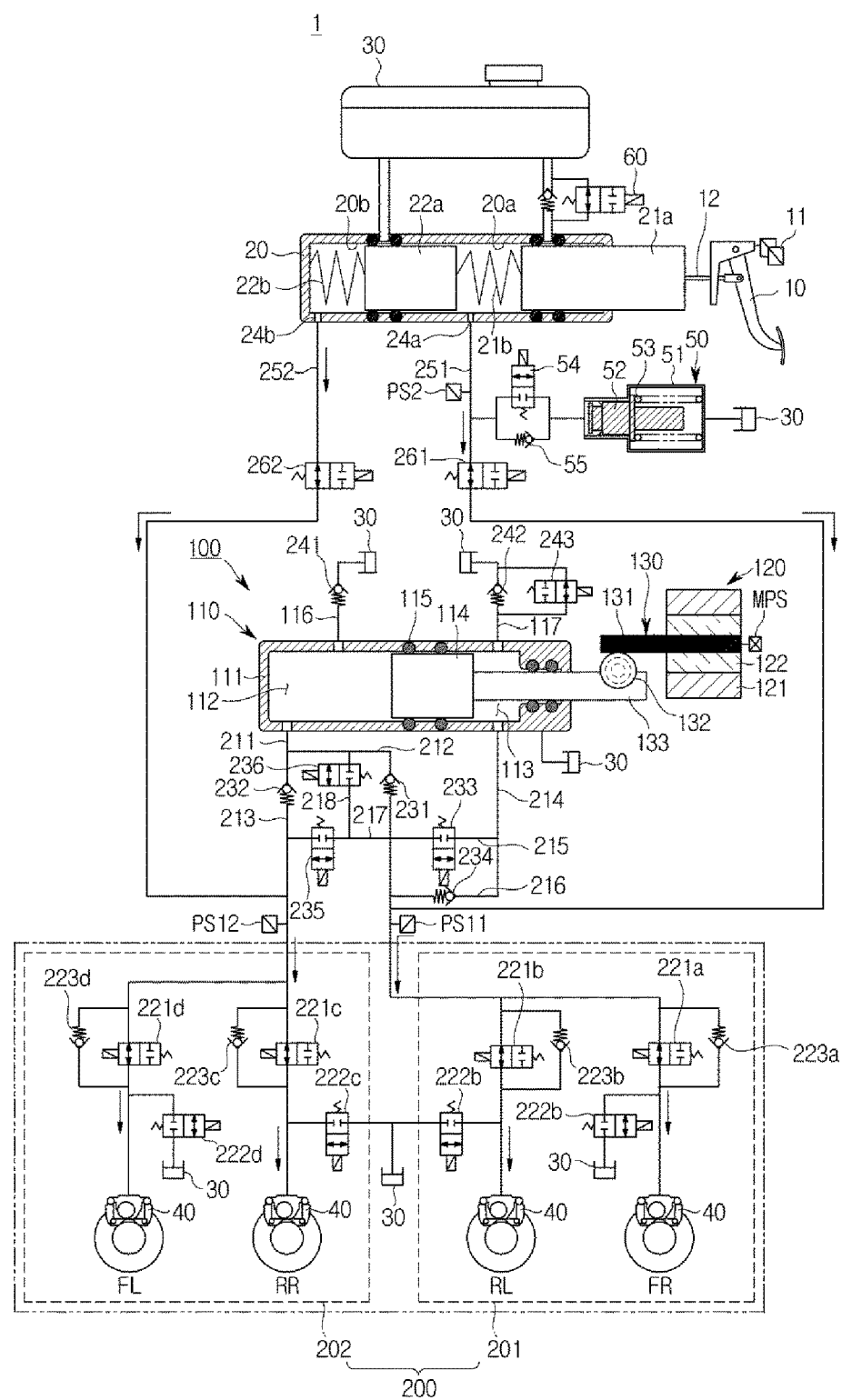
FIG. 12 is a hydraulic pressure circuit diagram illustrating a state in which an electric brake system according to an embodiment of the present disclosure operates abnormally.

Next, a case in which such an electric brake system 1 operates abnormally will be described. FIG. 12 is a hydraulic pressure circuit diagram illustrating a state in which the electric brake system 1 according to the embodiment of the present disclosure operates abnormally.

Referring to FIG. 12, when the electric brake system 1 operates abnormally, each of the valves 54, 60, 221a, 221b, 221c, 221d, 222a, 222b, 222c, 222d, 233, 235, 236, and 243 is provided in an initial state of braking that is a non-operating state.

When a driver pressurizes the brake pedal 10, the input rod 12 connected to the brake pedal 10 is moved forward and at the same time the first piston 21a being in contact with the input rod 12 is moved forward, and thus the second piston 22a is also moved forward by the pressurization or movement of the first piston 21a. At this point, since there is no gap between the input rod 12 and the first piston 21a, the braking may be rapidly performed.

Further, the hydraulic pressure discharged from the master cylinder 20 is delivered to the wheel cylinders 40 through the first and second backup flow paths 251 and 252 which are connected for the purpose of backup braking, thereby realizing a braking force.

At this point, the first and second cut valves 261 and 262 respectively installed at the first and second backup flow paths 251 and 252, and the inlet valves 221 configured to open and block the flow paths of the first hydraulic pressure circuit 201 and the second hydraulic pressure circuit 202 are configured with normally open type solenoid valves, and the simulator valve 54 and the outlet valves 222 are configured with normally closed type solenoid valves so that the hydraulic pressure is directly delivered to the four wheel cylinders 40. Therefore, braking is stably realized to improve braking safety.

Figure 13:
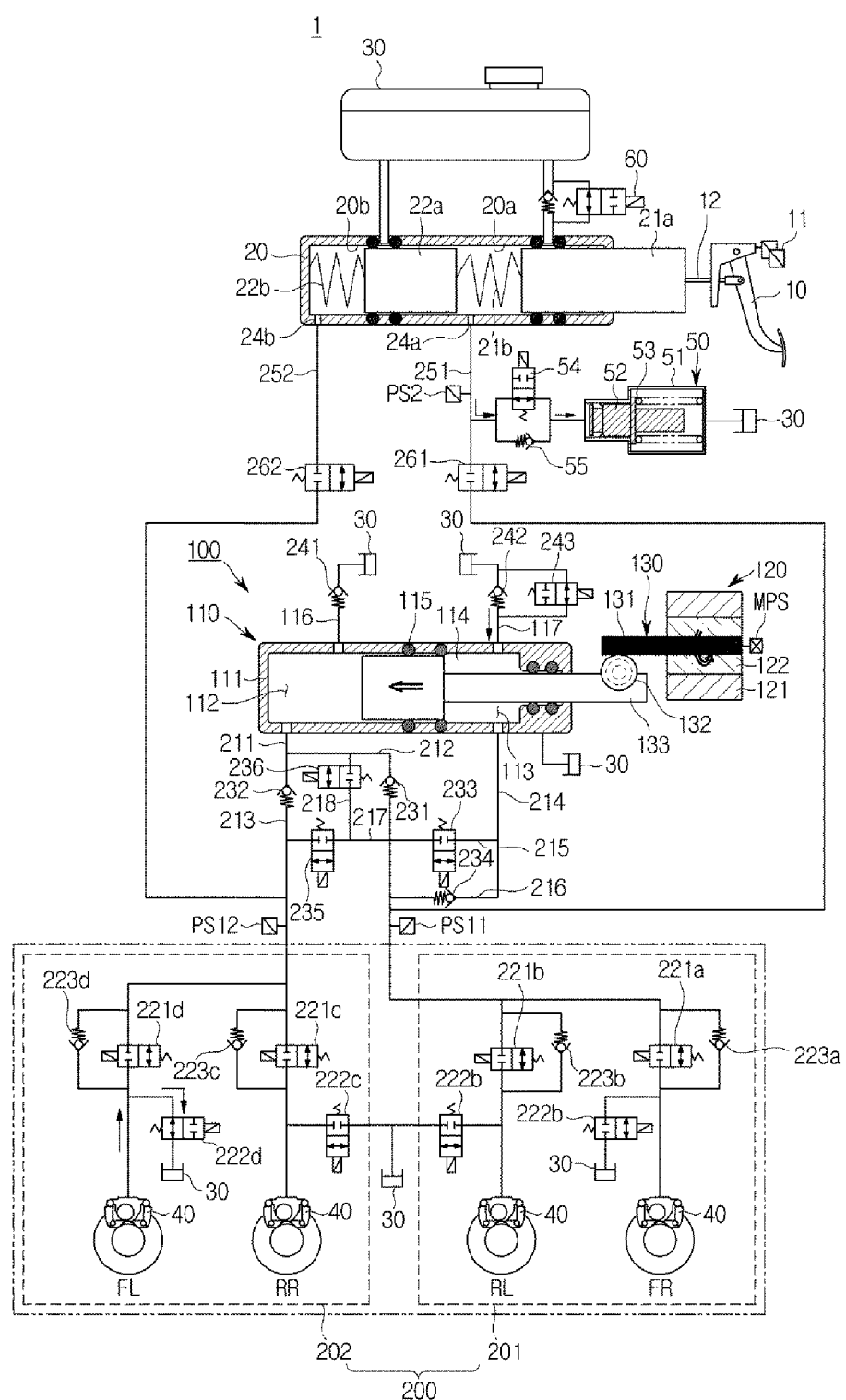
FIG. 13 is a hydraulic pressure circuit diagram illustrating a state in which an electric brake system according to an embodiment of the present disclosure operates in a dump mode.

FIG. 13 is a hydraulic pressure circuit diagram illustrating a state in which the electric brake system 1 according to the embodiment of the present disclosure operates in a dump mode.

The electric brake system 1 according to the embodiment of the present disclosure may discharge a braking pressure provided only to corresponding wheel cylinders 40 through the first to fourth outlet valves 222a, 222b, 222c, and 222d.

Referring to FIG. 13, when the first to fourth inlet valves 221a, 221b, 221c, and 221d are switched to a closed state, the first to third outlet valves 222a, 222b, and 222c are maintained in the closed state, and the fourth outlet valve 222d is switched to an open state, the hydraulic pressure discharged from the wheel cylinder 40 installed at the front left wheel FL is discharged to the reservoir 30 through the fourth outlet valve 222d.

The hydraulic pressure in the wheel cylinders 40 is discharged through the outlet valves 222 because a pressure in the reservoir 30 is less than that in the wheel cylinder 40. Generally, the pressure in the reservoir 30 is provided as atmospheric pressure. Since the pressure in the wheel cylinder 40 is generally significantly higher than atmospheric pressure, the hydraulic pressure of the wheel cylinders 40 may be rapidly discharged to the reservoirs 30 when the outlet valves 222 are open.

Meanwhile, although not shown in the drawing, the fourth outlet valve 222d is opened to discharge the hydraulic pressure of the corresponding wheel cylinder 40 and at the same time the first to third inlet valves 221a, 221b, and 221c are maintained in the open state so that the hydraulic pressure may be supplied to the three remaining wheels FR, RL, and RR.

Further, a flow rate of discharge from the wheel cylinder 40 increases as a difference in pressure between the wheel cylinder 40 and the first pressure chamber 112 becomes larger. As one example, as a volume of the first pressure chamber 112 is increased while the hydraulic piston 114 is moved backward, a flow rate of discharge from the wheel cylinder 40 may increase.

As described above, each of the valves 221a, 221b, 221c, 221d, 222a, 222b, 222c, 222d, 233, 235, 236, and 243 of the hydraulic pressure control unit 200 may be independently controlled to selectively deliver or discharge the hydraulic pressure to and from the wheel cylinder 40 of each of the wheels RL, RR, FL, and FR according to a required pressure such that precise control of the hydraulic pressure may be possible.

Figure 14:
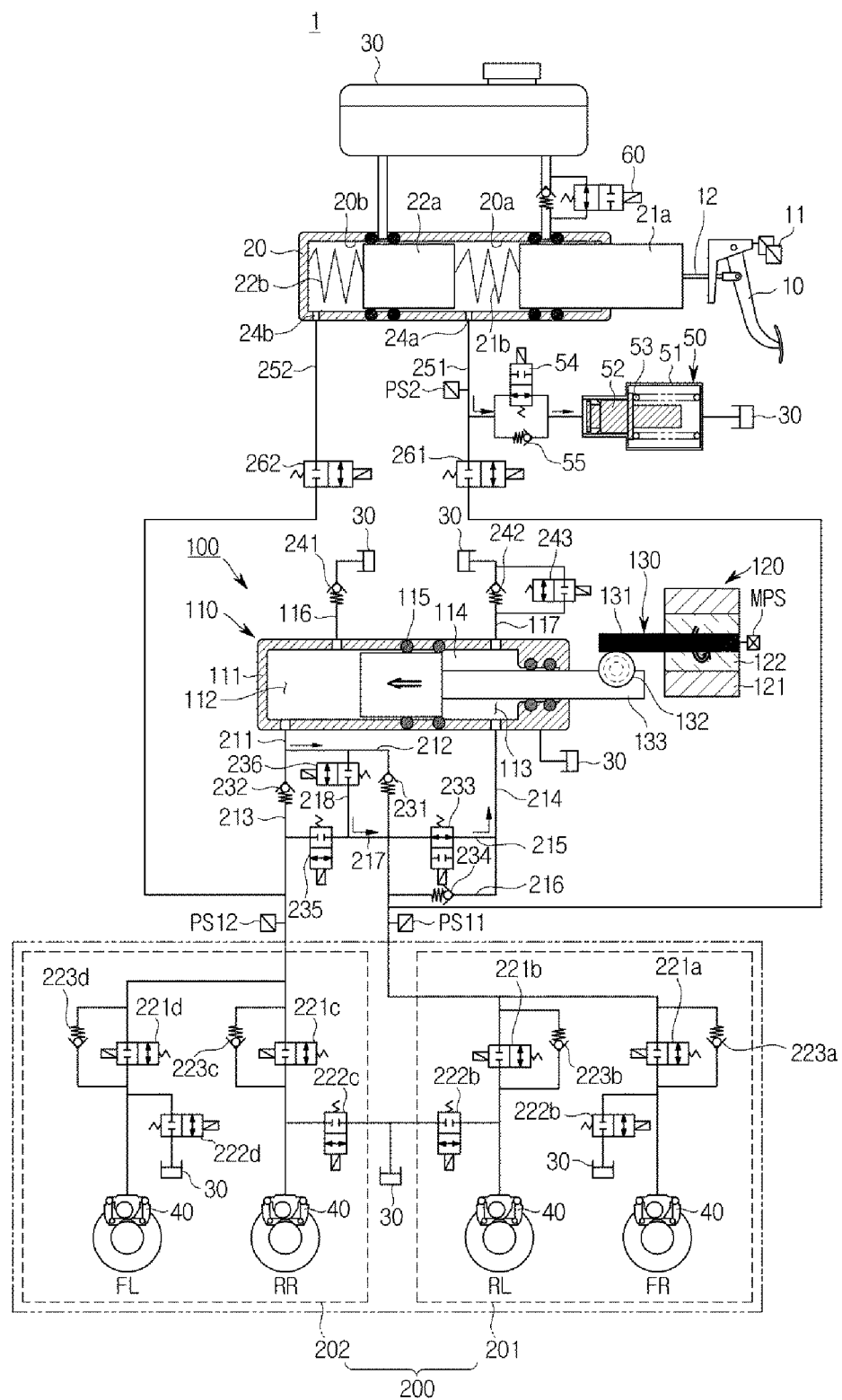
FIG. 14 is a hydraulic pressure circuit diagram illustrating a state in which an electric brake system according to an embodiment of the present disclosure operates in a balance mode.

FIG. 14 is a hydraulic pressure circuit diagram illustrating a state in which the electric brake system 1 according to the embodiment of the present disclosure operates in a balance mode.

The balance mode may be executed when an imbalance in pressure between the first pressure chamber 112 and the second pressure chamber 113 occurs. As one example, the ECU may sense an imbalance state in pressure by detecting the hydraulic pressure of the first hydraulic pressure circuit 201 and the hydraulic pressure of the second hydraulic pressure circuit 202 from the first and second hydraulic flow path pressure sensors PS11 and PS12.

In the balance mode, a balancing process may be performed to balance a pressure between the first and second pressure chambers 112 and 113 of the hydraulic pressure supply unit 110 by communicating the first and second pressure chambers 112 and 113 with each other. Generally, a pressure between the first pressure chamber 112 and the second pressure chamber 113 is balanced. As one example, in the case of a braking situation in which the hydraulic piston 114 is moved forward to apply a braking force, only a hydraulic pressure of the first pressure chamber 112 of the two pressure chambers is delivered to the wheel cylinders 40. However, in such a braking situation, since the oil in the reservoir 30 is delivered to the second pressure chamber 113 through the second dump flow path 117, a balance in pressure between the two pressure chambers is still maintained. On the other hand, in the case of a braking situation in which the hydraulic piston 114 is moved backward to apply a braking force, only a hydraulic pressure of the second pressure chamber 113 of the two pressure chambers is delivered to the wheel cylinders 40. However, even in such a braking situation, since the oil in the reservoir 30 is delivered to the first pressure chamber 112 through the first dump flow path 116, a balance in pressure between the two pressure chambers is still maintained.

However, when a leak occurs due to a repetitive operation of the hydraulic pressure supply device 100 or an ABS operation is abruptly performed, an imbalance in pressure between the first pressure chamber 112 and the second pressure chamber 113 may occur. That is, the hydraulic piston 114 may not be located at a calculated position and an incorrect operation may be performed.

Hereinafter, an example when a pressure in the first pressure chamber 112 is greater than that in the second pressure chamber 113 will be described. The hydraulic piston 114 is moved forward when the motor 120 operates, and during such a procedure, a pressure between the first pressure chamber 112 and the second pressure chamber 113 is balanced. When the pressure in the second pressure chamber 113 is greater than that in the first pressure chamber 112, the hydraulic pressure in the second pressure chamber 113 is delivered to the first pressure chamber 112 to balance a pressure.

Referring to FIG. 14, in the balance mode, the third control valve 233 and the sixth control valve 236 may be switched to an open state, thereby opening the fifth hydraulic flow path 215 and the eighth hydraulic flow path 218. That is, the second hydraulic flow path 212, the eighth hydraulic flow path 218, the seventh hydraulic flow path 217, and the fifth hydraulic flow path 215 are connected to one another, thereby communicating the first pressure chamber 112 with the second pressure chamber 113. Accordingly, the pressure between the first pressure chamber 112 and the second pressure chamber 113 is balanced. At this point, to promote the balancing process, the motor 120 may operate the hydraulic piston 114 to move forward or backward.

Hereinafter, an inspection mode will be described with reference to FIGS. 15 to 18. The inspection mode includes a mode for inspecting whether a leak occurs in a sealing member of the master cylinder 20, a mode for inspecting whether the second piston 22a of the master cylinder 20 is stuck, a mode for inspecting whether a leak occurs in the simulator valve 54, and a mode for inspecting whether air is present in the master cylinder 20.

The electric brake system 1 according to the embodiment of the present disclosure may perform the inspection mode before a driver drives or while a vehicle is stopped or traveling, thereby periodically inspecting whether an abnormality occurs.

Figure 15:
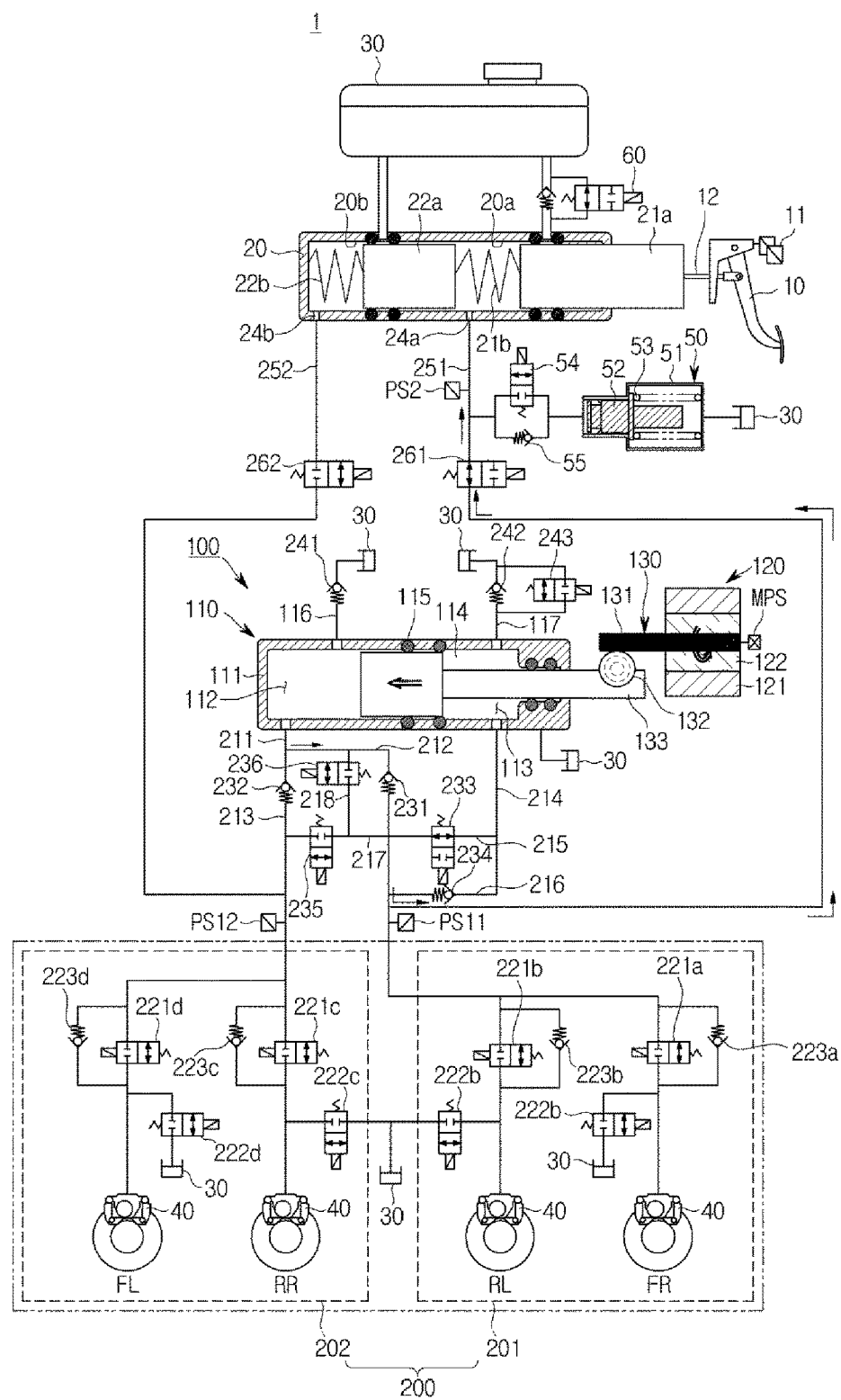
FIG. 15 is a hydraulic pressure circuit diagram illustrating a state in which an electric brake system according to an embodiment of the present disclosure inspects whether a leak occurs in the master cylinder.

FIG. 15 is a hydraulic pressure circuit diagram illustrating a state in which the electric brake system 1 according to the embodiment of the present disclosure inspects whether a leak occurs in the master cylinder 20.

When a leak occurs in a sealing member blocking a flow of oil between the master cylinder 20 and the first piston 21a or the second piston 22a, pedal effort applied through the brake pedal 10 may be lost, giving the driver an uncomfortable pedal feeling. In addition, when the driver switches to the fallback mode after recognizing the occurrence of the leak as a normal state, or steps on the brake pedal 10 when the electric brake system 1 is operated abnormally, a hydraulic pressure generated in the master cylinder 20 is reduced when compared to that in the normal state, and braking performance may be deteriorated.

As shown in FIG. 15, in the case of determining whether a leak occurs in the sealing member 25 provided between the first piston 21a and the master cylinder 20, the driver steps on the brake pedal 10 to form a hydraulic pressure in the master cylinder 20 in a state in which each of the valves 54, 60, 221a, 221b, 221c, 221d, 222a, 222b, 222c, 222d, 233, 235, 236, 243, 261, and 262 is provided in an initial state of braking, that is, a non-operating state. At this point, a target pressure Target P or a pressure which is expected to be formed inside the master cylinder 20 is compared to a measured value of the first or second hydraulic flow path pressure sensor PS11 or PS12.

As a result, when the measured value of the first or second hydraulic flow path pressure sensor PS11 or PS12 is less than the target pressure Target P or the pressure which is expected to be formed inside the master cylinder 20, the inspection valve 60 is switched again to the closed state and then the above described process is repeated.

On the other hand, when the measured value of the first or second hydraulic flow path pressure sensor PS11 or PS12 is equal to the target pressure Target P or the pressure which is expected to be formed inside the master cylinder 20 after the inspection valve 60 is blocked, it may be determined that a leak occurs in the sealing member 25 provided at an outer surface of the first piston 21a of the master cylinder 20. That is, a portion of the pressure formed in the first master chamber 20a while the first piston 21a is moved forward may be determined to leak into the reservoir 30 through the sealing member 25.

When the leak occurs in the sealing member 25, the hydraulic pressure required by the driver may not be delivered to the wheel cylinders 40 when emergency braking is performed. Therefore, when the leak is determined to occur in the sealing member 25, the inspection valve 60 may be switched to the closed state when emergency braking is performed, thereby preventing the hydraulic pressure inside the master cylinder 20 from leaking into the reservoir 30.

Figure 16:
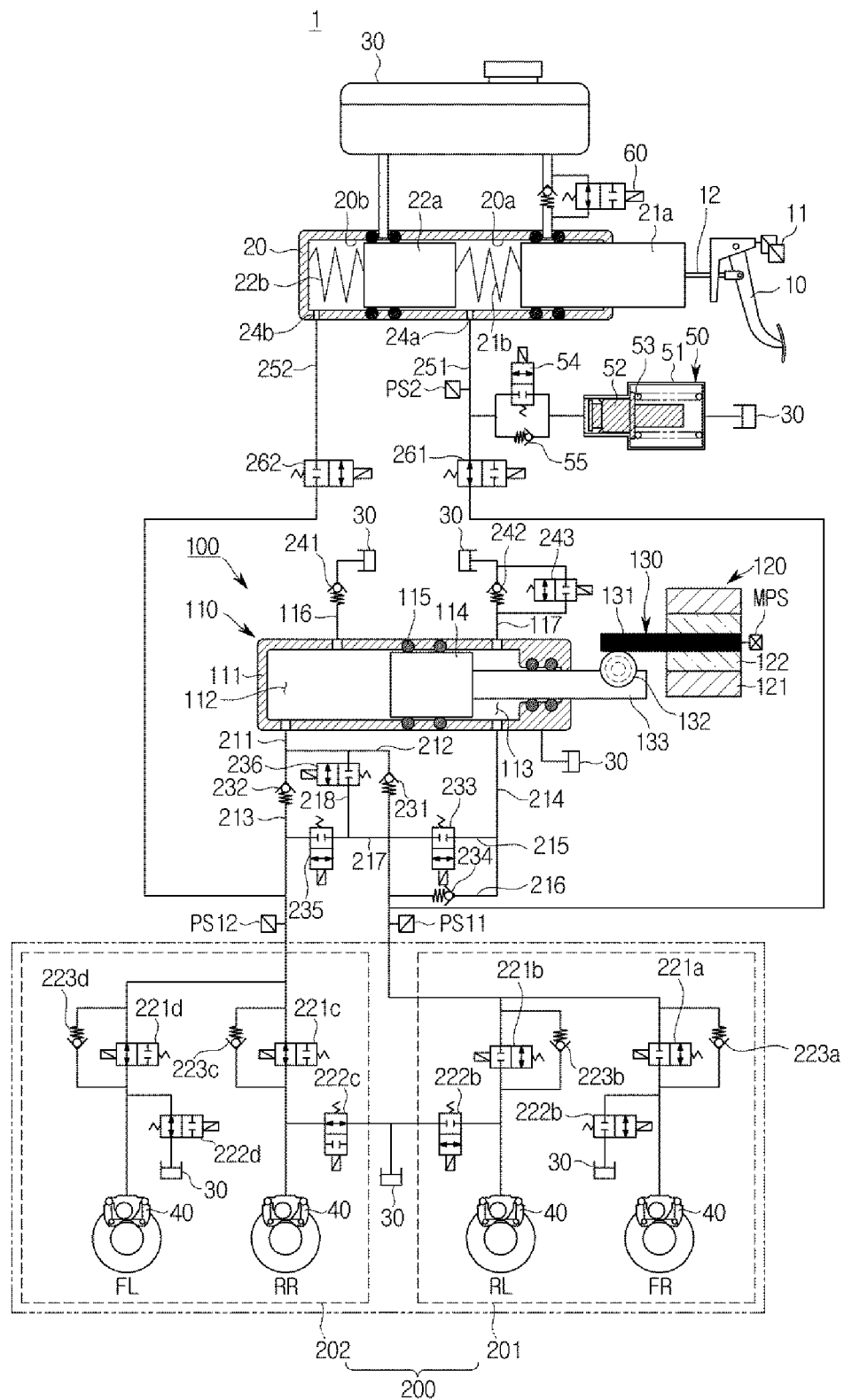
FIG. 16 is a hydraulic pressure circuit diagram illustrating a preparation state in which an electric brake system according to an embodiment of the present disclosure inspects whether the master cylinder is stuck.
Figure 17:
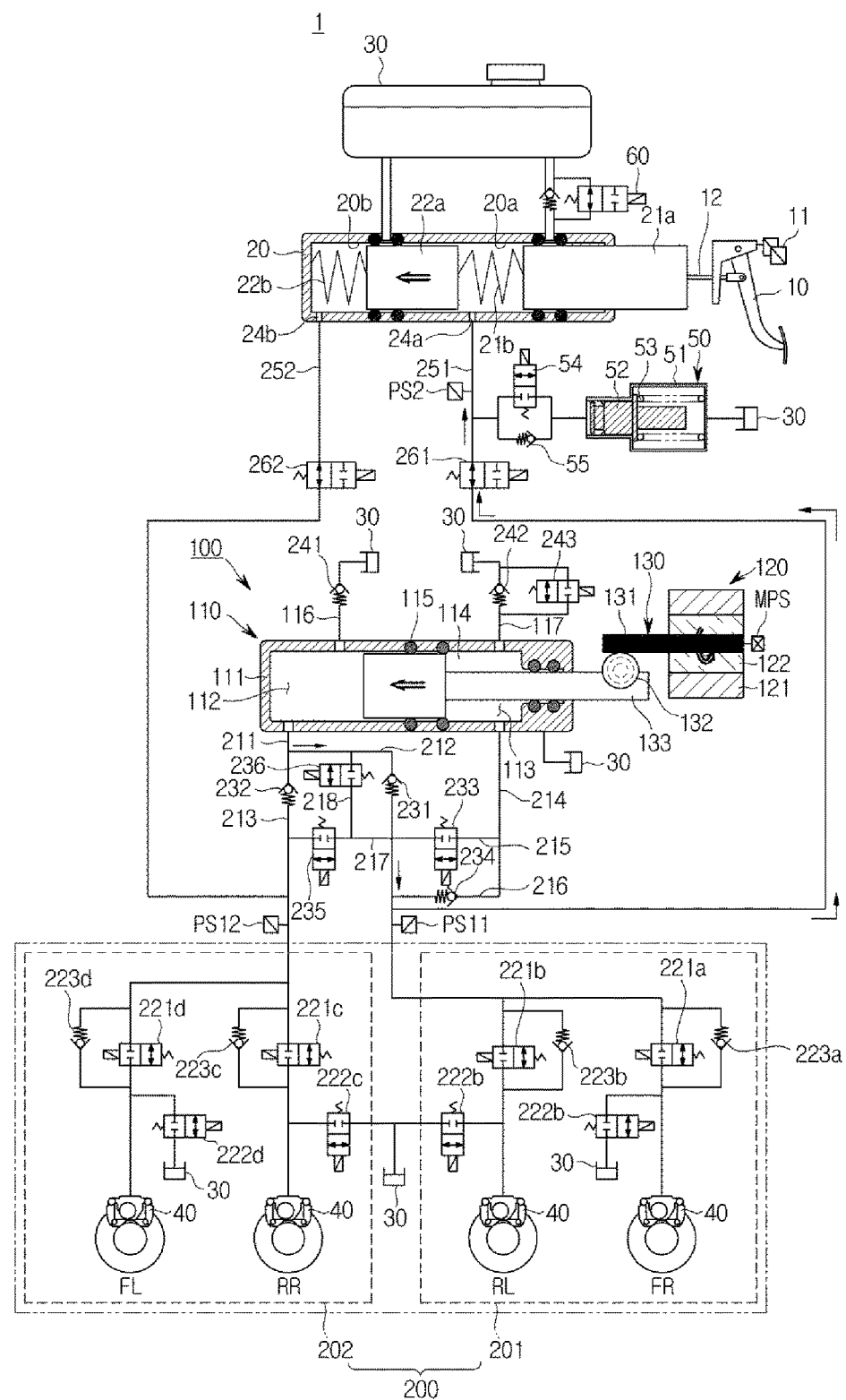
FIG. 17 is a hydraulic pressure circuit diagram illustrating an inspection state in which an electric brake system according to an embodiment of the present disclosure inspects whether the master cylinder is stuck.

FIG. 16 is a hydraulic pressure circuit diagram illustrating a preparation state in which the electric brake system 1 according to an embodiment of the present disclosure inspects whether the master cylinder 20 is stuck, and FIG. 17 is a hydraulic pressure circuit diagram illustrating an inspection state in which the electric brake system 1 according to the embodiment of the present disclosure inspects whether the master cylinder 20 is stuck.

When the second piston 22a of the master cylinder 20 is stuck to an inner wall thereof, the driver cannot recognize an abnormality when the electric brake system 1 operates normally. However, when an abnormality occurs in functions of other elements of the electric brake system 1 to be switched to the fallback mode, the second piston 22a may not move or may not be moved in a non-linear manner, and braking performance may be deteriorated.

As shown in FIG. 16, in the preparation state for determining whether the second piston 22a of the master cylinder 20 is stuck thereinside, the second cut valve 262 and the inspection valve 60 is switched to a closed state in a state in which each of the valves 54, 60, 221a, 221b, 221c, 221d, 222a, 222b, 222c, 222d, 233, 235, 236, 243, 261, and 262 is provided in an initial state of braking, and the third and fourth outlet valves 222c and 222d connected to the second backup flow path 252 are switched to an open state. As a result, the hydraulic pressure of the flow path under the second cut valve 262 is discharged to the reservoir 30 through the third and fourth outlet valves 222c and 222d. That is, the flow path under the second cut valve 262 is provided in an atmospheric pressure state.

Further, as shown in FIG. 17, the second cut valve 262 and the inspection valve 60 are switched to the open state, and the third and fourth outlet valves 222c and 222d connected to the second backup flow path 252 are switched to the closed state.

Thereafter, the hydraulic pressure supply device 100 is operated to generate a hydraulic pressure. When the second piston 22a is not stuck, the hydraulic pressure of the hydraulic pressure supply device 100 is delivered to the first master chamber 20a through the first backup flow path 251, and the second piston 22a is pressurized and moved to generate the hydraulic pressure in the second hydraulic pressure circuit 202 such that the hydraulic pressure over the atmospheric pressure may be sensed by the second hydraulic flow path pressure sensor PS12.

However, when the second piston 22a is stuck, the second piston 22a is not moved due to the hydraulic pressure in the first master chamber 20a, and the hydraulic pressure is not transferred to the second hydraulic pressure circuit 202 such that the hydraulic pressure over the atmospheric pressure is not sensed by the second hydraulic flow path pressure sensor PS12. Alternatively, when the second piston 22a is moved in a nonlinear manner, a non-linear pressure may be sensed by the second hydraulic flow path pressure sensor PS12.

Meanwhile, unlike FIG. 17, the third and fourth inlet valves 221c and 221d may be switched to the closed state. In this case, a hydraulic pressure may be delivered from the second master chamber 20b only to the flow path between the third and fourth inlet valves 221c and 221d, so that a pressure reaction may be immediately inspected.

Figure 18:
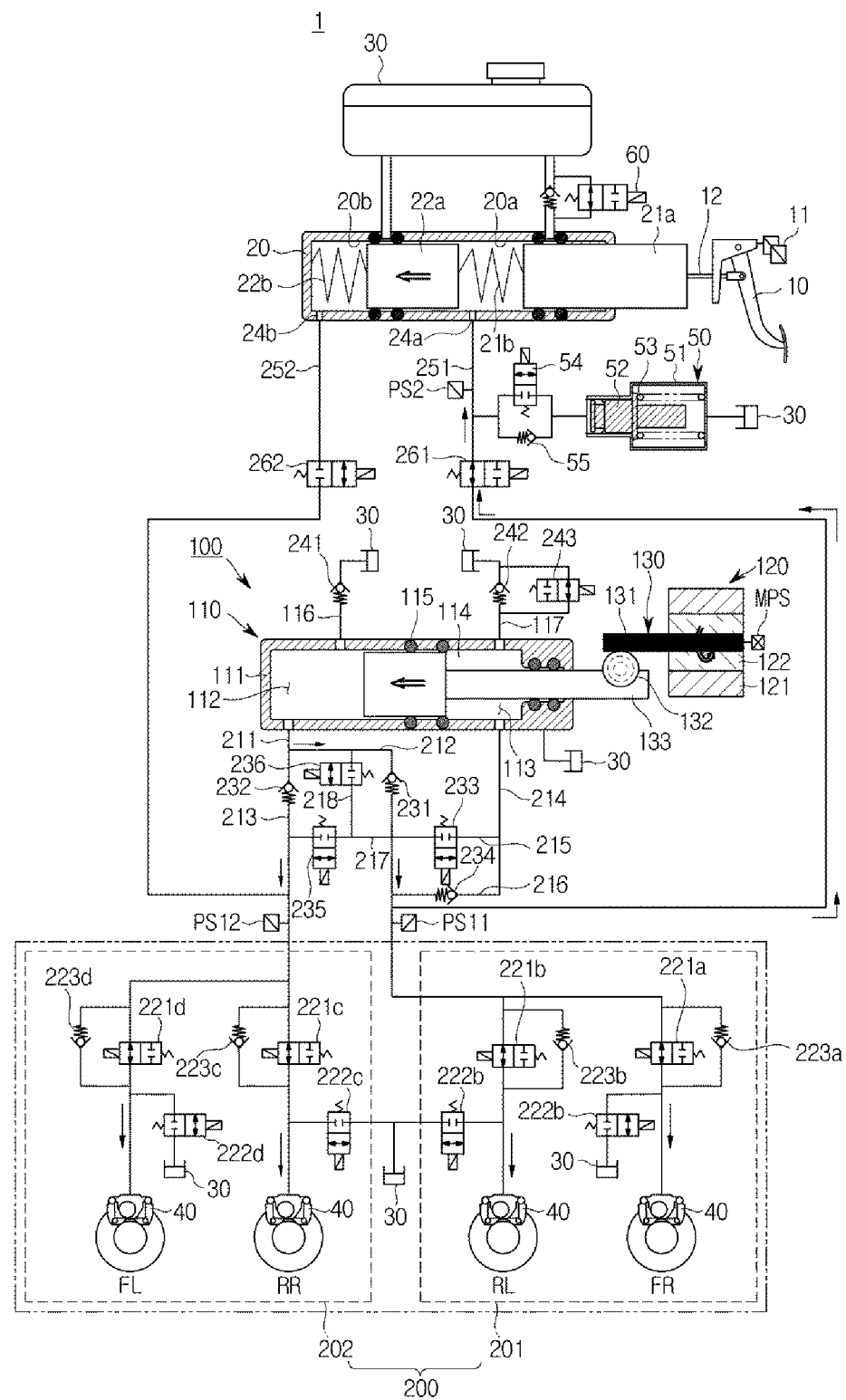
FIG. 18 is a hydraulic pressure circuit diagram illustrating a state in which an electric brake system according to an embodiment of the present disclosure inspects whether a leak occurs in a simulator valve or air is present in the master cylinder.

FIG. 18 is a hydraulic pressure circuit diagram illustrating a state in which the electric brake system 1 according to the embodiment of the present disclosure inspects whether a leak occurs in the simulator valve 54 or whether air is present in the master cylinder 20.

Referring to FIG. 18, when the electric brake system 1 operates abnormally, each of the valves 54, 60, 221a, 221b, 221c, 221d, 222a, 222b, 222c, 222d, 233, 235, 236, 243, 261, and 262 is provided in an initial state of braking, that is, a non-operating state, and the first and second cut valves 261 and 262 installed at the first and second backup flow paths 251 and 252, respectively, and each of the inlet valves 221 provided at an upstream side of the wheel cylinder 40 provided at each of the wheels RR, RL, FR, and FL are opened so that the hydraulic pressure is directly delivered to the wheel cylinders 40.

At this point, the simulator valve 54 is provided in the closed state so that the hydraulic pressure delivered to the wheel cylinders 40 through the first backup flow path 251 is prevented from leaking into the reservoir 30 through the simulation device 50. Therefore, the driver steps on the brake pedal 10 so that the hydraulic pressure discharged from the master cylinder 20 is delivered to the wheel cylinders 40 without a loss to ensure stable braking.

However, when a leak occurs in the simulator valve 54, a portion of the hydraulic pressure discharged from the master cylinder 20 may be lost to the reservoir 30 through the simulator valve 54. As a result, a braking force is not obtained as intended by the driver and a problem of braking stability occurs.

In addition, when air is present in the master cylinder 20, the above-described problem may occur. When the air is present in the master cylinder 20, the pedal feeling provided to the driver may be lightened, and when the driver switches to the fallback mode after recognizing the lightened pedal feeling as a normal state, braking performance may be deteriorated.

When the hydraulic pressure discharged from the hydraulic pressure supply device 100 is delivered to the reservoir 30 and causes a pressure loss, it is difficult to identify whether a leak occurs in the simulator valve 54 or air is present.

Therefore, in the inspection mode, the inspection valve 60 may be closed and thus a hydraulic pressure circuit connected to the hydraulic pressure supply device 100 may be configured as a closed circuit. That is, the inspection valve 60, the simulator valve 54, and the outlet valves 222 are closed and thus the flow paths connecting the hydraulic pressure supply device 100 to the reservoirs 30 are closed so that the closed circuit may be configured.

The electric brake system 1 may provide a hydraulic pressure to only the first backup flow path 251, which is connected to the simulation device 50, of the first and second backup flow paths 251 and 252 in the inspection mode. Therefore, to prevent the hydraulic pressure discharged from the hydraulic pressure supply device 100 from being delivered to the master cylinder 20 along the second backup flow path 252, the second cut valve 262 may be switched to a closed state. Also, the fifth control valve 235 connecting the first hydraulic pressure circuit 201 to the second hydraulic pressure circuit 202 is maintained in the closed state and the sixth control valve 236 communicating the fifth hydraulic flow path 215 with the second hydraulic flow path 212 is closed so that the hydraulic pressure in the second pressure chamber 113 may be prevented from leaking into the first pressure chamber 112.

Meanwhile, unlike FIG. 18, in the inspection mode, at an initial state of each of the valves 54, 60, 221a, 221b, 221c, 221d, 222a, 222b, 222c, 222d, 233, 235, 236, and 243 provided at the electric brake system 1 of the present disclosure, the first to fourth inlet valves 221a, 221b, 221c, and 221d and the second cut valve 262 may be switched to a closed state, and the first cut valve 261 and the third control valve 233 are maintained in the open state so that the hydraulic pressure generated in the hydraulic pressure supply device 100 may be delivered to the master cylinder 20.

The inlet valves 221 are closed and thus the hydraulic pressure in the hydraulic pressure supply device 100 may be prevented from being delivered to the wheel cylinder 40, so that the electric brake system 1 of the present disclosure may perform the inspection mode while the vehicle is traveling as well as before the vehicle is traveling or is stopped. At the same time, the second cut valve 262 is switched to the closed state so that the hydraulic pressure of the hydraulic pressure supply device 100 may be prevented from circulating along the first backup flow path 251 and the second backup flow path 252, and the inspection valve 60 is switched to a closed state so that the hydraulic pressure supplied to the master cylinder 20 may be prevented from leaking into the reservoir 30.

Specifically, when inspecting whether air is present in the master cylinder 20, it is necessary to close the inlet valves 221 to prevent the hydraulic pressure from being delivered to the wheel cylinder 40. Since a variation in hydraulic pressure caused by the presence of air in the chamber 20a of the master cylinder 20 is minute, it is preferable to minimize interference between the wheel cylinders 40.

In the inspection mode, after generating the hydraulic pressure in the hydraulic pressure supply device 100, the ECU may analyze a signal transmitted from the backup flow path pressure sensor PS2 configured to measure an oil pressure of the master cylinder 20 to sense whether a leak occurs in the simulator valve 54 or whether air is present in the master cylinder 20. As one example, when the backup flow path pressure sensor PS2 detects that a loss does not occur, it may be determined that a leak does not occur in the simulator valve 54 or that there is no air in the master cylinder 20, and otherwise, it may be determined that the leak occurs in the simulator valve 54 or the air is present in the master cylinder 20.

As is apparent from the above description, the electric brake system according to the embodiments of the present disclosure is capable of sensing a leak of the seal of the master cylinder, a stuck state of the piston, a leak of the simulator valve, or whether air is present in the master cylinder by operating the inspection valve to execute the inspection mode.

Therefore, even when a failure occurs in an element of the electric brake system, it is possible to generate a braking force equal to or greater than a certain level.

Although the present disclosure has been described above by way of specific embodiments and the accompanying drawings, the present disclosure is not limited thereto, and it should be understood that numerous modified embodiments can be devised by those skilled in the art without departing from the gist defined by the appended claims, and such modified embodiments may not be individually understood from the present disclosure.

What is claimed is:
1. An electric brake system comprising:
a master cylinder including first and second chambers which are formed inside the master cylinder and configured to communicate with a reservoir which stores oil, and first and second pistons disposed at the first and second chambers, respectively, and configured to discharge oil by movements of the first and second pistons according to pedal effort of a brake pedal;
a simulation device connected to the master cylinder and configured to provide a reaction force according to the pedal effort of the brake pedal;
a hydraulic pressure supply device configured to generate a hydraulic pressure by a hydraulic piston which is operated by an electrical signal that is output to correspond to displacement of the brake pedal;
a hydraulic pressure control unit configured to deliver the hydraulic pressure discharged from the hydraulic pressure supply device to wheel cylinders provided at each of wheels, and including an inlet valve provided at a flow path connecting the hydraulic pressure supply device and at least one of the wheel cylinders, and an outlet valve provided at a flow path connecting between the inlet valve, at least one of the wheel cylinders, and the reservoir;
a first backup flow path configured to connect the first chamber of the master cylinder and the hydraulic pressure control unit and connected to a first hydraulic flow path that is connected to the hydraulic pressure supply device;
a second backup flow path configured to connect the second chamber of the master cylinder and the hydraulic pressure control unit and connected to a second hydraulic flow path that is connected to the hydraulic pressure supply device;
a first cut valve provided between the first chamber of the master cylinder and a position at which the first hydraulic flow path is connected to the first backup flow path, and configured to control delivery of a hydraulic pressure;
a second cut valve provided between the second chamber of the master cylinder and a position at which the second hydraulic flow path is connected to the second backup flow path, and configured to control delivery of a hydraulic pressure;
an electronic control unit (ECU) configured to control valves on the basis of hydraulic pressure information and displacement information of the brake pedal; and
a first pressure sensor installed between the first chamber of the master cylinder and the first cut valve, and a second pressure sensor installed at the first hydraulic flow path, the second hydraulic flow path, or the hydraulic pressure control unit,
wherein, in a state in which the second cut valve is closed and the outlet valve, which is connected to the second backup flow path, is open, to discharge the hydraulic pressure in the hydraulic pressure control unit connected to the second hydraulic flow path, the ECU operates the hydraulic pressure supply device to generate a pressure in the first chamber, and when a measured value of the second pressure sensor is less than an expected value, the ECU determines that the second piston of the master cylinder is stuck.
2. The electric brake system of claim 1, wherein the ECU compares a measured value of the first pressure sensor with the measured value of the second pressure sensor, and when the measured value of the second pressure sensor is less than the measured value of the first pressure sensor, the ECU determines that the second piston of the master cylinder is stuck.

3. The electric brake system of claim 1, further comprising:
a check valve provided at a reservoir flow path connecting the reservoir and the master cylinder, and configured to allow fluid to flow only in a direction from the reservoir to the master cylinder; and
an inspection valve installed at a bypass flow path connecting front and rear sides of the check valve on the reservoir flow path.

4. The electric brake system of claim 1, further comprising a simulator valve configured to open and close a flow path between the master cylinder and the simulation device, wherein the ECU controls the simulator valve to be in a closed state before operating the hydraulic pressure supply device.

5. The electric brake system of claim 1, wherein the ECU controls the inlet valve to be in a closed state.

6. An electric brake system comprising:
a master cylinder including first and second chambers which are formed inside the master cylinder and configured to communicate with a reservoir which stores oil, and first and second pistons disposed at the first and second chambers, respectively, and configured to discharge oil by movements of the first and second pistons according to pedal effort of a brake pedal;
a simulation device connected to the master cylinder and configured to provide a reaction force according to the pedal effort of the brake pedal;
a hydraulic pressure supply device configured to generate a hydraulic pressure by a hydraulic piston which is operated by an electrical signal that is output to correspond to displacement of the brake pedal;
a hydraulic pressure control unit configured to deliver the hydraulic pressure discharged from the hydraulic pressure supply device to wheel cylinders provided at each of wheels, and including an inlet valve provided at a flow path connecting the hydraulic pressure supply device and at least one of the wheel cylinders, and an outlet valve provided at a flow path connecting between at least one of the wheel cylinders, and the reservoir;
a first backup flow path configured to connect the first chamber of the master cylinder and the hydraulic pressure control unit and connected to a first hydraulic flow path that is connected to the hydraulic pressure supply device;
a second backup flow path configured to connect the second chamber of the master cylinder and the hydraulic pressure control unit and connected to a second hydraulic flow path that is connected to the hydraulic pressure supply device;
a first cut valve provided between the first chamber of the master cylinder and a position at which the first hydraulic flow path is connected to the first backup flow path, and configured to control delivery of a hydraulic pressure;
a second cut valve provided between the second chamber of the master cylinder and a position at which the second hydraulic flow path is connected to the second backup flow path, and configured to control delivery of a hydraulic pressure;
an electronic control unit (ECU) configured to control valves on the basis of hydraulic pressure information and displacement information of the brake pedal; and
a first pressure sensor installed between the second chamber of the master cylinder and the second cut valve, and a second pressure sensor installed at the first hydraulic flow path, the second hydraulic flow path, or the hydraulic pressure control unit,
wherein, in a state in which the second cut valve is closed, the ECU operates the hydraulic pressure supply device to generate a pressure in the first chamber, and when a measured value of the first pressure sensor is less than an expected value, the ECU determines that air is present in the first chamber of the master cylinder.

7. The electric brake system of claim 6, wherein, in a state in which the inlet valve connected to the second backup flow path is closed to block a flow path between the hydraulic pressure supply device and the at least one of the wheel cylinders, the ECU operates the hydraulic pressure supply device to generate a pressure in the first chamber, and when the measured value of the first pressure sensor is less than the expected value, the ECU determines that air is present in the first chamber of the master cylinder.

8. The electric brake system of claim 6, further comprising:
a check valve provided at a reservoir flow path connecting the reservoir and the master cylinder, and configured to allow fluid to flow only in a direction from the reservoir to the master cylinder; and
an inspection valve installed at a bypass flow path connecting front and rear sides of the check valve on the reservoir flow path.

9. The electric brake system of claim 6, further comprising a simulator valve configured to open and close a flow path between the master cylinder and the simulation device, wherein the ECU controls the simulator valve to be in a closed state before operating the hydraulic pressure supply device.

10. The electric brake system of claim 6, wherein the ECU controls the inlet valve to be in a closed state.

* * * * *